US012348871B2

(12) United States Patent
Ju et al.

(10) Patent No.: US 12,348,871 B2
(45) Date of Patent: Jul. 1, 2025

(54) ELECTRONIC DEVICE HAVING FLEXIBLE DISPLAY, AND CAMERA MODULE CONTROL METHOD THEREFOR

(71) Applicant: SAMSUNG ELECTRONICS CO., LTD., Suwon-si (KR)

(72) Inventors: Wanjae Ju, Suwon-si (KR); Sanguk Kim, Suwon-si (KR); Jongdoo Kim, Suwon-si (KR); Hyoseok Na, Suwon-si (KR); Daeseung Park, Suwon-si (KR); Wonsub Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 87 days.

(21) Appl. No.: 18/144,007

(22) Filed: May 5, 2023

(65) Prior Publication Data
US 2023/0276130 A1   Aug. 31, 2023

Related U.S. Application Data

(63) Continuation of application No. PCT/KR2021/015387, filed on Oct. 29, 2021.

(30) Foreign Application Priority Data

Nov. 6, 2020   (KR) .......................... 10-2020-0147374

(51) Int. Cl.
*H04N 7/18*   (2006.01)
*G06F 1/16*   (2006.01)
(Continued)

(52) U.S. Cl.
CPC ......... *H04N 23/695* (2023.01); *G06F 1/1652* (2013.01); *G06F 1/1686* (2013.01); *H04N 23/53* (2023.01)

(58) Field of Classification Search
CPC .................................................. H04N 23/695
(Continued)

(56) References Cited

U.S. PATENT DOCUMENTS

| 7,917,935 B2 | 3/2011 | McAlpine et al. |
| 8,810,627 B1 * | 8/2014 | Cho ........................ H04N 23/45 348/38 |

(Continued)

FOREIGN PATENT DOCUMENTS

| CN | 109662403 A | 4/2019 |
| CN | 110445981 A | 11/2019 |

(Continued)

OTHER PUBLICATIONS

Written Opinion (PCT/ISA/237) issued Feb. 3, 2022 by the International Searching Authority for International Patent Application No. PCT/KR2021/015387.
(Continued)

*Primary Examiner* — Leron Beck
(74) *Attorney, Agent, or Firm* — Sughrue Mion, PLLC

(57) ABSTRACT

An electronic device includes a flexible display configured to be rollable; at least one camera; and a processor operatively connected to the flexible display and the camera, wherein the processor is configured to: detect operation initiation of the camera; identify a rolling state of the flexible display, based on the operation initiation; rotate the camera toward a designated direction, based on the rolling state of the flexible display; and based on the rolling state of the flexible display, display an image obtained from the designated direction via the camera in a center of the flexible display.

20 Claims, 18 Drawing Sheets

(51) Int. Cl.
*H04N 23/53* (2023.01)
*H04N 23/695* (2023.01)

(58) Field of Classification Search
USPC .......................................................... 348/169
See application file for complete search history.

(56) References Cited

U.S. PATENT DOCUMENTS

| | | | |
|---|---|---|---|
| 9,710,020 B2* | 7/2017 | Choi ..................... | G06F 1/1652 |
| 10,514,727 B2 | 12/2019 | Seo et al. | |
| 10,517,180 B2 | 12/2019 | Choi et al. | |
| 11,003,207 B2 | 5/2021 | Kim et al. | |
| 2005/0140812 A1 | 6/2005 | Yoo et al. | |
| 2005/0280732 A1* | 12/2005 | Misawa ............... | H04N 23/531 |
| | | | 348/E5.025 |
| 2005/0285963 A1* | 12/2005 | Misawa ............... | H04N 23/651 |
| | | | 348/E5.025 |
| 2007/0216639 A1* | 9/2007 | LaFarre ................. | G09F 9/301 |
| | | | 345/107 |
| 2013/0044240 A1* | 2/2013 | Leskela ................. | H04N 23/54 |
| | | | 348/239 |
| 2013/0221840 A1* | 8/2013 | Oh ......................... | H10K 50/84 |
| | | | 313/511 |
| 2013/0222998 A1* | 8/2013 | Cho ...................... | G06F 1/1601 |
| | | | 361/679.27 |
| 2014/0002430 A1* | 1/2014 | Kwack .................. | G09G 3/035 |
| | | | 345/207 |
| 2015/0002398 A1* | 1/2015 | Nakhimov ............ | G06F 1/1652 |
| | | | 345/173 |
| 2015/0009129 A1* | 1/2015 | Song ..................... | G06F 1/1652 |
| | | | 345/156 |
| 2015/0029229 A1* | 1/2015 | Voutsas ................. | G06F 1/1647 |
| | | | 345/1.3 |
| 2016/0026219 A1* | 1/2016 | Kim ..................... | H04M 1/0245 |
| | | | 345/173 |
| 2016/0187929 A1* | 6/2016 | Kim ...................... | G06F 1/1643 |
| | | | 345/184 |
| 2016/0373654 A1* | 12/2016 | Kwon .................... | G09G 5/373 |
| 2017/0042045 A1* | 2/2017 | Jiang ....................... | G09F 9/301 |
| 2017/0140504 A1* | 5/2017 | Jeong .................... | G06F 1/1677 |
| 2017/0212607 A1* | 7/2017 | Yoon ...................... | G06F 3/147 |
| 2017/0309226 A1* | 10/2017 | In ........................... | G09G 3/035 |
| 2017/0310799 A1* | 10/2017 | Lin ........................ | H04M 1/0268 |
| 2017/0318693 A1* | 11/2017 | Kim ....................... | H02K 11/21 |
| 2017/0344071 A1* | 11/2017 | Lee ....................... | G06F 1/1686 |
| 2018/0014415 A1* | 1/2018 | Choi ..................... | H05K 5/0247 |
| 2018/0048815 A1* | 2/2018 | Kim ..................... | H04N 23/633 |
| 2020/0326754 A1 | 10/2020 | Kim et al. | |
| 2020/0348729 A1* | 11/2020 | Koh ...................... | H04M 1/0214 |

FOREIGN PATENT DOCUMENTS

| | | |
|---|---|---|
| CN | 111064896 A | 4/2020 |
| CN | 111246101 A | 6/2020 |
| KR | 10-2005-0091955 A | 9/2005 |
| KR | 10-2017-0055865 A | 5/2017 |
| KR | 10-2017-0062121 A | 6/2017 |
| KR | 10-2017-0073958 A | 6/2017 |
| KR | 10-1766542 B1 | 8/2017 |
| KR | 10-2019-0119719 A | 10/2019 |
| KR | 10-2104588 B1 | 4/2020 |
| KR | 10-2020-0121151 A | 10/2020 |
| WO | 2020/133087 A1 | 7/2020 |

OTHER PUBLICATIONS

Search Report (PCT/ISA/210) issued Feb. 3, 2022 by the International Searching Authority for International Patent Application No. PCT/KR2021/015387.

* cited by examiner (501)

(503)

ELECTRONIC DEVICE HAVING FLEXIBLE DISPLAY, AND CAMERA MODULE CONTROL METHOD THEREFOR

CROSS REFERENCES TO RELATED APPLICATIONS

This application is a bypass continuation of International Application No. PCT/KR2021/015387, filed on Oct. 29, 2021, which claims priority from Korean Patent Application No. 10-2020-0147374, filed on Nov. 6, 2020, in the Korean Intellectual Property Office, the disclosures of which are incorporated by reference herein in their entireties.

BACKGROUND

1. Field

The disclosure relates to an electronic device (e.g., a rollable device) having a flexible display, and a method of controlling a camera module thereof.

2. Description of Related Art

With the advance of digital technology, various types of electronic devices such as a mobile communication terminal, a personal digital assistant (PDA), an electronic organizer, a smartphone, a tablet personal computer (PC), and/or a laptop PC, are widely used. Such electronic devices have continuously evolved in terms of hardware and/or software for functional support and increment.

Electronic devices may have a limited size for portability, and this also limits the size of the display thereof. Recently, various types of electronic devices providing a larger screen are being developed. For example, an electronic device has been designed to have multiple displays (or display surfaces) and provide various services (or functions) to a user through an expanded screen.

An electronic device may have a new form factor like a rollable device. Rollable devices may have a foldable (or bendable or circularly windable) display (e.g., a rollable (or rolling) display or a flexible display) and may be wound (or rolled) or unrolled to be used. There is a growing need for development of hardware of electronic devices, a user interface (UI), and the management thereof according to the new form factor.

An electronic device uses a camera module to provide an image capturing function enabling image capturing of a subject. In the electronic device, the camera module is fixedly mounted at a designated position (a fixed position in a cylindrical housing) of the electronic device. For example, in a case of a rollable device, various hardware components (e.g., a camera module, a battery, a sensor module, and a mechanical structure) and an electrical structure may be designed inside a cylindrical housing of the electronic device (e.g., a cylindrical mechanical housing).

When a user takes a selfie by using a rollable device, a subject (e.g., the user) may be moved with respect to a display module by opening (or rolling) of the display module. Therefore, the subject may deviate from an image capturing range of the fixed camera module in the rollable device or eccentricity may occur, whereby an image of the user in information of an image obtained from the camera module may be disposed and provided at a side of the display module. Accordingly, the user is required to move the rollable device again so that the subject is positioned within the image capturing range of the camera module, which may be a hassle.

SUMMARY

Provided are a method and a device by which the rotation of a camera module is controllable based on a discharged amount/an introduced amount of a display module in a rollable device.

In addition, provided are a method and a device by which a camera module is rotatable based on a moved amount caused by rolling of a display module in a rollable device, so that a subject of an image obtained from the camera module is positioned in the center of the display module.

According to an aspect of the disclosure, an electronic device includes: a flexible display configured to be rollable; at least one camera; and a processor operatively connected to the flexible display and the camera, wherein the processor is configured to: detect operation initiation of the camera; identify a rolling state of the flexible display, based on the operation initiation; rotate the camera toward a designated direction, based on the rolling state of the flexible display; and based on the rolling state of the flexible display, display an image obtained from the designated direction via the camera in a center of the flexible display.

The processor may be further configured to: identify a rotation angle of the camera, based on the rolling state of the flexible display; and rotate the camera toward the designated direction, based on the rotation angle of the camera.

The processor may be further configured to: determine whether the flexible display is in an open state or a closed state at a time of the operation initiation of the camera; based on the flexible display being in the closed state, control the camera to operate in a first designated direction; and based on the flexible display being in the open state, control the camera to operate in a second designated direction.

The processor may be further configured to: monitor the rolling state of the flexible display, based on switching of the flexible display from the closed state to the open state; and rotate the camera toward the second designated direction, based on the rolling state of the flexible display.

The processor may be further configured to: determine a rotation angle corresponding to the rolling state of the flexible display; and rotate the camera toward the second designated direction, based on the rotation angle, wherein the rotation angle is determined based on a movement distance of the flexible display and a focal distance of the camera.

The processor may be further configured to, based on the flexible display being in the open state, rotate the camera toward a central axis direction of the flexible display to cause a subject positioned on a central axis of the flexible display to be positioned on a central axis of the camera.

The processor may be further configured to control the camera to be rotated by an angle corresponding to a movement distance of the flexible display to face the second designated direction.

The processor may be further configured to, based on the rotation of the camera, control the flexible display to display an image of a subject obtained via the camera in the center of the flexible display.

The processor may be further configured to: based on the flexible display being in the open state, track a subject from an image obtained via the camera; and determine whether to rotate the camera, based on a position of the subject obtained by the tracking of the subject.

The processor may be further configured to: based on determining that the position of the subject is in front of the camera, determine to not rotate the camera to cause the camera to operate in the first designated direction; and based on determining that the position of the subject is not in front of the camera, determine to rotate the camera to cause the camera to operate in the second designated direction.

The processor may be further configured to, at a time of using the camera, rotate an angle of the camera to correspond to the rolling state of the flexible display.

The electronic device may include a housing configured to receive the flexible display, and the camera may be disposed to be rotatable toward the designated direction at an end of the housing.

The camera may be configured to be received in a housing, and be extended from the housing at a time of the operation initiation to be rotatable toward the designated direction at one end of the housing.

The camera may be configured to be controlled to be rotated by the processor or be controlled to be rotated based on an interaction caused by mechanical combination with the flexible display.

According to an aspect of the disclosure, an operation method of an electronic device, includes: detecting operation initiation of a camera of the electronic device; identifying a rolling state of a flexible display of the electronic device, based on the operation initiation; rotating the camera toward a designated direction, based on the rolling state of the flexible display; and based on the rolling state of the flexible display, displaying an image obtained from the designated direction via the camera in a center of the flexible display.

The rotating may include: identifying a rotation angle of the camera, based on the rolling state of the flexible display; and rotating the camera toward a designated direction, based on the rotation angle of the camera.

The identifying may include determining whether the flexible display is in an open state or a closed state at a time of the operation initiation of the front camera, and the rotating the camera may include: based on the flexible display being in the closed state, controlling the camera to operate in a first designated direction; and based on the flexible display being in the open state, controlling the camera to operate in a second designated direction.

The rotating may further include: determining a rotation angle corresponding to the rolling state of the flexible display; and rotating the front camera toward the second designated direction, based on the rotation angle, and the rotation angle may be determined at least based on a movement distance of the flexible display and a focal distance of the front camera.

The operating method may further include: based on the flexible display being in the open state, tracking a subject from an image obtained via the camera, and determining whether to rotate the camera, based on a position of the subject obtained by the tracking of the subject.

The operating method may further include: based on determining that the position of the subject is in front of the camera, determining to not rotate the camera to cause the camera to operate in the first designated direction; and based on determining that the position of the subject is not in front of the camera, determining to rotate the camera to cause the camera to operate in the second designated direction.

In accordance with aspect of the disclosure, a computer-readable recording medium has, recorded therein, a program for executing the method in a processor.

According to an electronic device and an operation method thereof according to one or more embodiments of the disclosure, when a display module of the electronic device is rolled, the direction of a camera module may be automatically controlled to face a user (or subject), so that the subject is positioned at the center in the direction of the camera module. Therefore, the electronic device may provide a user with acquisition of a better image in a predetermined field of view of the camera module.

According to one or more embodiments of the disclosure, eccentricity of an image, which is caused by a user's movement away from the central axis of a camera module due to rolling (e.g., opening or expanding) of a display module of an electronic device, may be overcome. According to one or more embodiments, an electronic device may automatically adjust the angle of a camera module according to rolling of a display module to meet the center axes of the camera module and the display module to each other, so as to enable improvement of the usability of the camera module in the rollable device, and acquisition of a better image (e.g., a selfie image) by a user.

Various other advantageous effects identified explicitly or implicitly through this document may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
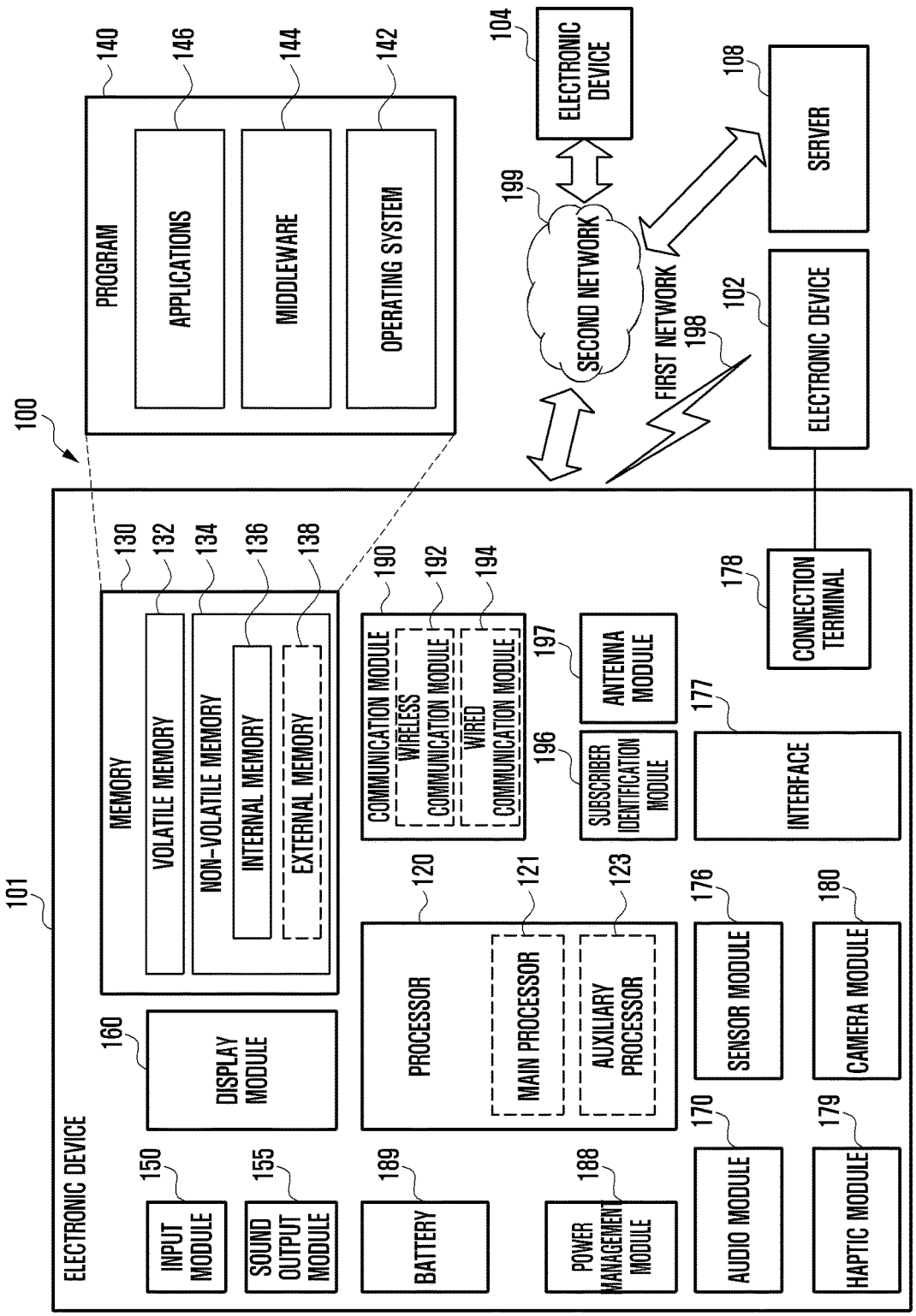
FIG. 1 is a block diagram illustrating an example electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

According to an embodiment, the sensor module 176 may be a device that detects an angle by which the electronic device 101 is inclined with respect to the earth's surface and/or a direction which the electronic device 101 faces in a three-dimensional coordinate system by using sensing data obtained in at least one sensor among multiple sensors. However, embodiments of the disclosure are not limited thereto, and various sensors capable of acquisition of information (e.g., azimuth) relating to the angle by which the electronic device 101 is inclined may be used. For example, the acceleration sensor may sense a linear movement of the electronic device 101 and/or information on 3-axis acceleration of the electronic device 101. The gyro sensor may sense information related to rotation of the electronic device 101, and a geomagnetic sensor may sense information on the direction which the electronic device 101 faces, in an absolute coordinate system. According to an embodiment, the processor 120 may use 9-axis motion data obtained using the gyro sensor and the geomagnetic sensor. For example, the processor 120 may generate a virtual coordinate space, based on an azimuth (e.g., yaw, pitch, and/or roll values) measured in the 9-axis motion data, classify a region of the virtual coordinate space as a horizontal (landscape) range, and classify the other region as a vertical (portrait) range.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
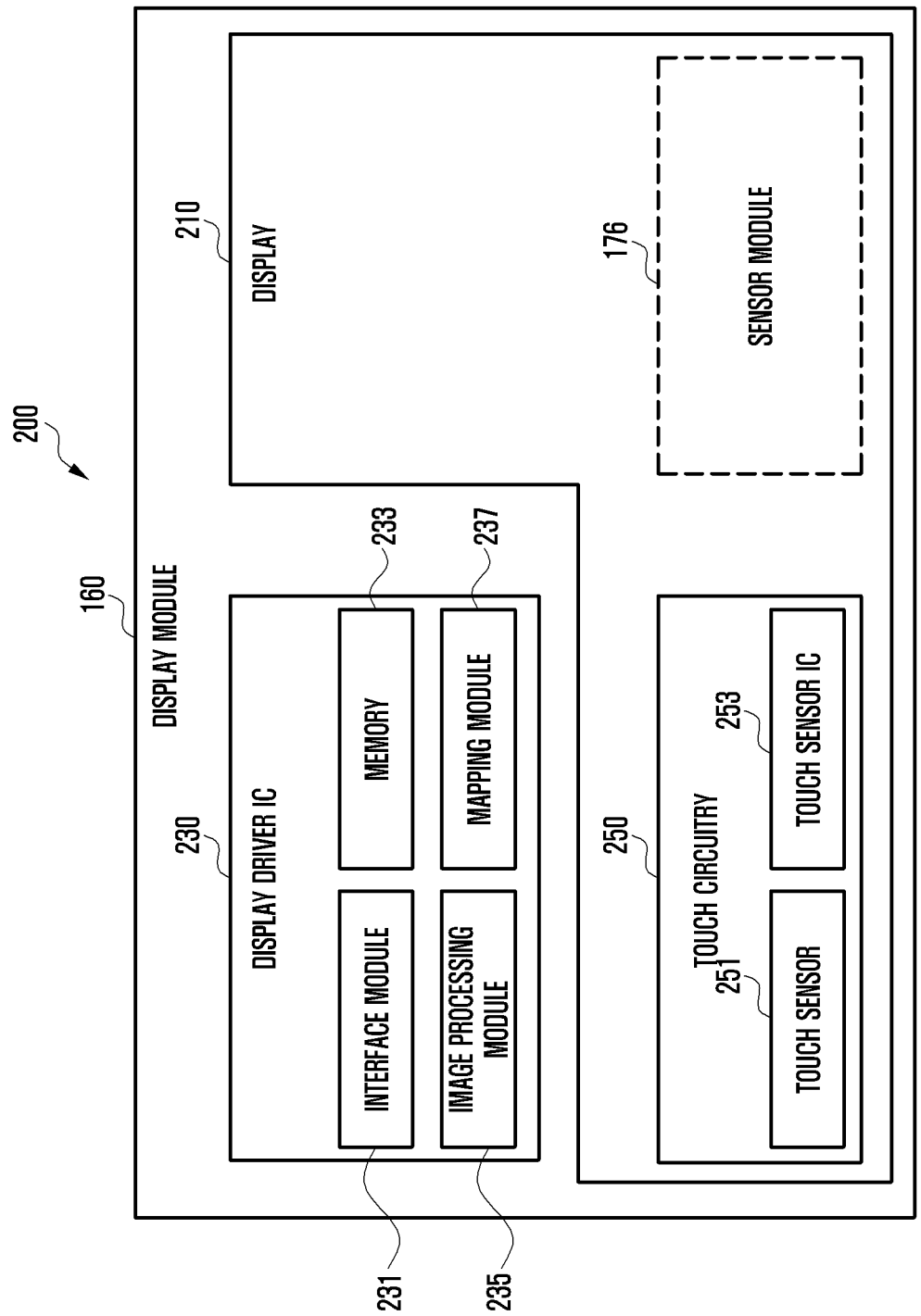
FIG. 2 is a block diagram of a display module according to various embodiments.

FIG. 2 is a block diagram 200 illustrating the display module 160 according to various embodiments.

Referring to FIG. 2, the display module 160 may include a display 210 and a display driver integrated circuit (DDI) 230 to control the display 210. The DDI 230 may include an interface module 231, memory 233 (e.g., buffer memory), an image processing module 235, or a mapping module 237.

The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an AP)) or the auxiliary processor 123 (e.g., a GPU) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor integrated circuit (IC) 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
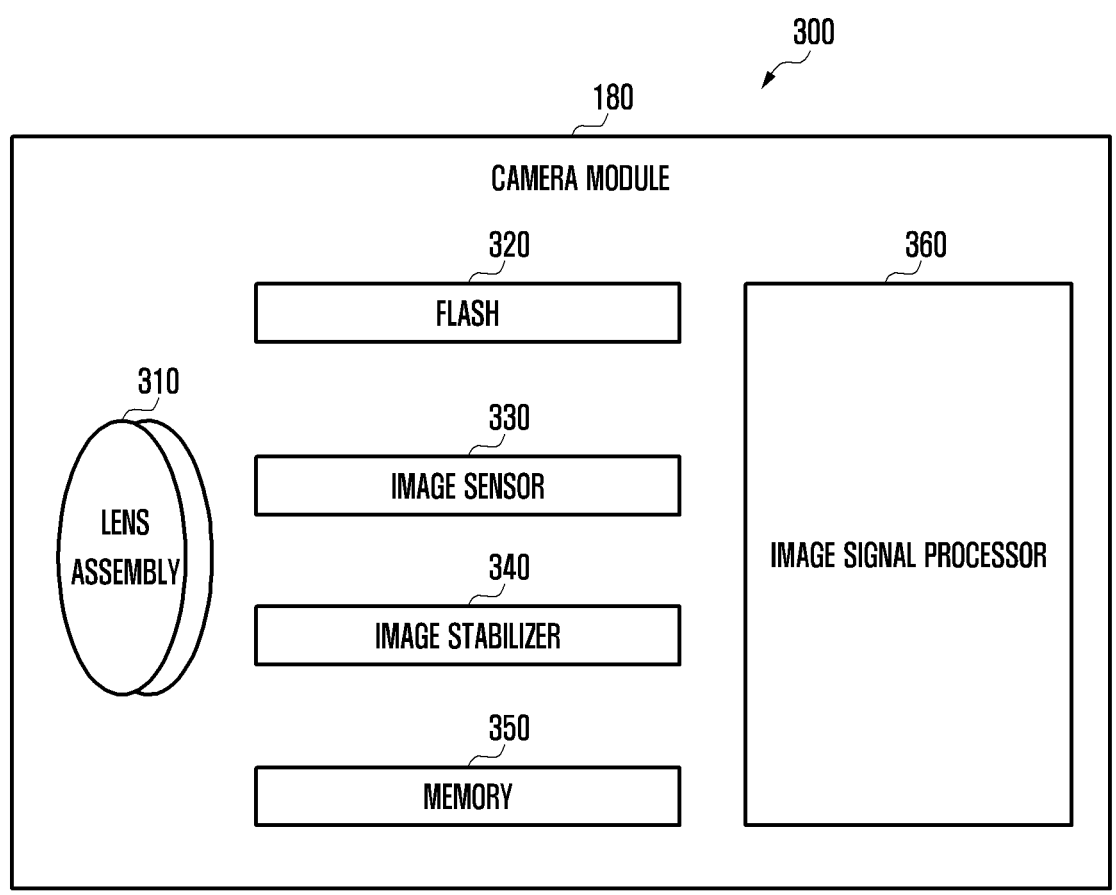
FIG. 3 is a block diagram illustrating the camera module according to various embodiments.

FIG. 3 is a block diagram 300 illustrating the camera module 180 according to various embodiments.

Referring to FIG. 3, the camera module 180 may include a lens assembly 310, a flash 320, an image sensor 330, an image stabilizer 340, memory 350 (e.g., buffer memory), or an image signal processor 360.

The lens assembly 310 may collect light emitted or reflected from an object whose image is to be taken. The lens assembly 310 may include one or more lenses. According to an embodiment, the camera module 180 may include a plurality of lens assemblies 310. In such a case, the camera module 180 may form, for example, a dual camera, a 360-degree camera, or a spherical camera. Some of the plurality of lens assemblies 310 may have the same lens attribute (e.g., view angle, focal length, auto-focusing, f number, or optical zoom), or at least one lens assembly may have one or more lens attributes different from those of another lens assembly. The lens assembly 310 may include, for example, a wide-angle lens or a telephoto lens.

The flash 320 may emit light that is used to reinforce light reflected from an object. According to an embodiment, the flash 320 may include one or more light emitting diodes (LEDs) (e.g., a red-green-blue (RGB) LED, a white LED, an infrared (IR) LED, or an ultraviolet (UV) LED) or a xenon lamp.

The image sensor 330 may obtain an image corresponding to an object by converting light emitted or reflected from the object and transmitted via the lens assembly 310 into an electrical signal. According to an embodiment, the image sensor 330 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 330 may be implemented using, for example, a charged coupled device (CCD) sensor or a complementary metal oxide semiconductor (CMOS) sensor.

The image stabilizer 340 may move the image sensor 330 or at least one lens included in the lens assembly 310 in a particular direction, or control an operational attribute (e.g., adjust the read-out timing) of the image sensor 330 in response to the movement of the camera module 180 or the electronic device 101 including the camera module 180. This allows compensating for at least part of a negative effect (e.g., image blurring) by the movement on an image being captured. According to an embodiment, the image stabilizer 340 may sense such a movement by the camera module 180 or the electronic device 101 using a gyro sensor (not shown) or an acceleration sensor (not shown) disposed inside or outside the camera module 180. According to an embodiment, the image stabilizer 340 may be implemented, for example, as an optical image stabilizer.

The memory 350 may store, at least temporarily, at least part of an image obtained via the image sensor 330 for a subsequent image processing task. For example, if image capturing is delayed due to shutter lag or multiple images are quickly captured, a raw image obtained (e.g., a Bayer-patterned image, a high-resolution image) may be stored in the memory 350, and its corresponding copy image (e.g., a low-resolution image) may be previewed via the display device 160. Thereafter, if a specified condition is met (e.g., by a user's input or system command), at least part of the raw image stored in the memory 350 may be obtained and processed, for example, by the image signal processor 360. According to an embodiment, the memory 350 may be configured as at least part of the memory 130 or as a separate memory that is operated independently from the memory 130.

The image signal processor 360 may perform one or more image processing with respect to an image obtained via the image sensor 330 or an image stored in the memory 350. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 360 may perform control (e.g., exposure time control or read-out timing control) with respect to at least one (e.g., the image sensor 330) of the components included in the camera module 180. An image processed by the image signal processor 360 may be stored back in the memory 350 for further processing, or may be provided to an external component (e.g., the memory 130, the display device 160, the electronic device 102, the electronic device 104, or the server 108) outside the camera module 180. According to an embodiment, the image signal processor 360 may be configured as at least part of the processor 120, or as a separate processor that is operated independently from the processor 120. If the image signal processor 360 is configured as a separate processor from the processor 120, at least one image processed by the image signal processor 360 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules #80 may form, for example, a front camera and at least another of the plurality of camera modules 180 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 4A:
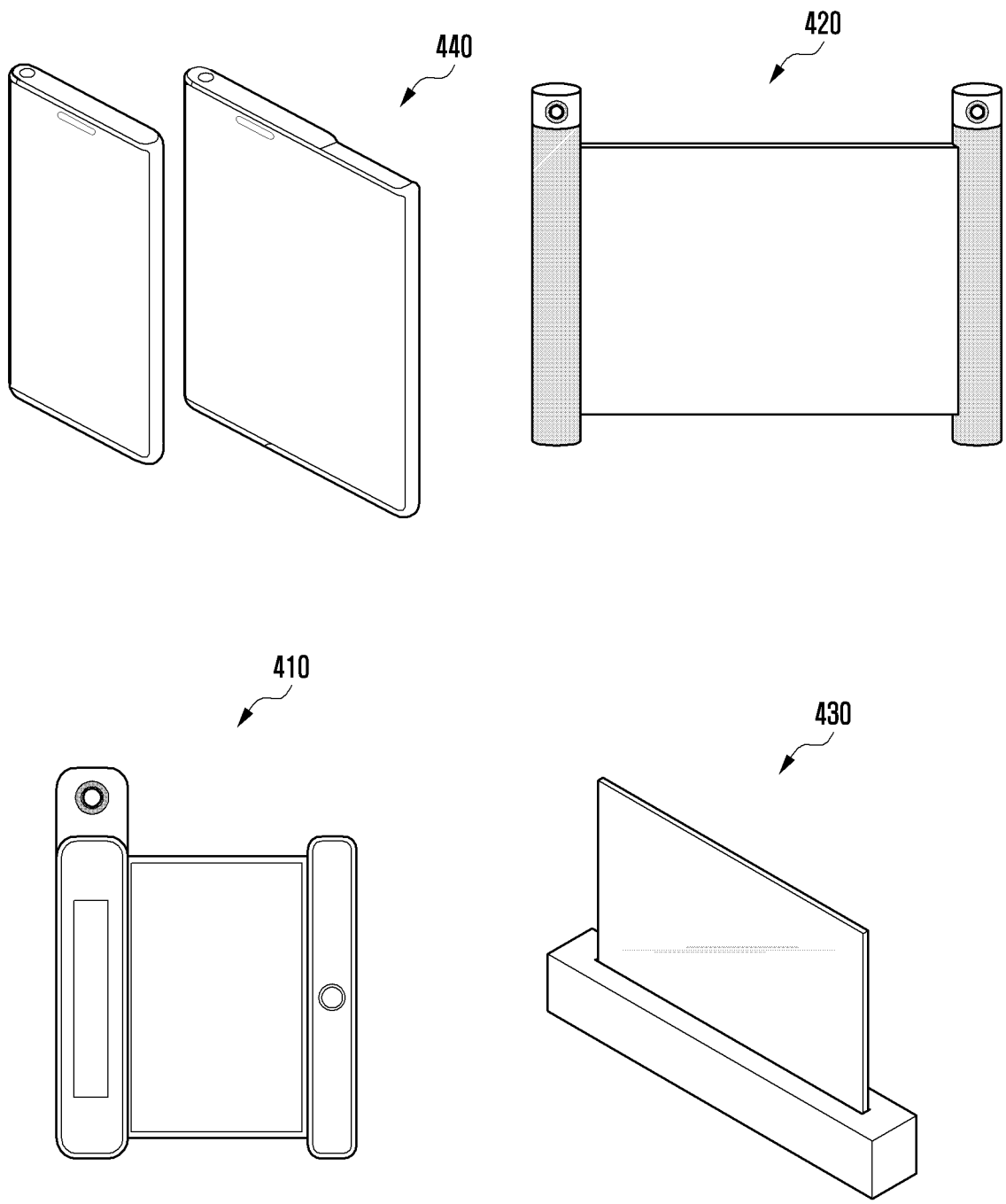
FIG. 4A and FIG. 4B are diagrams illustrating examples of electronic device according to various embodiments.
Figure 4B:
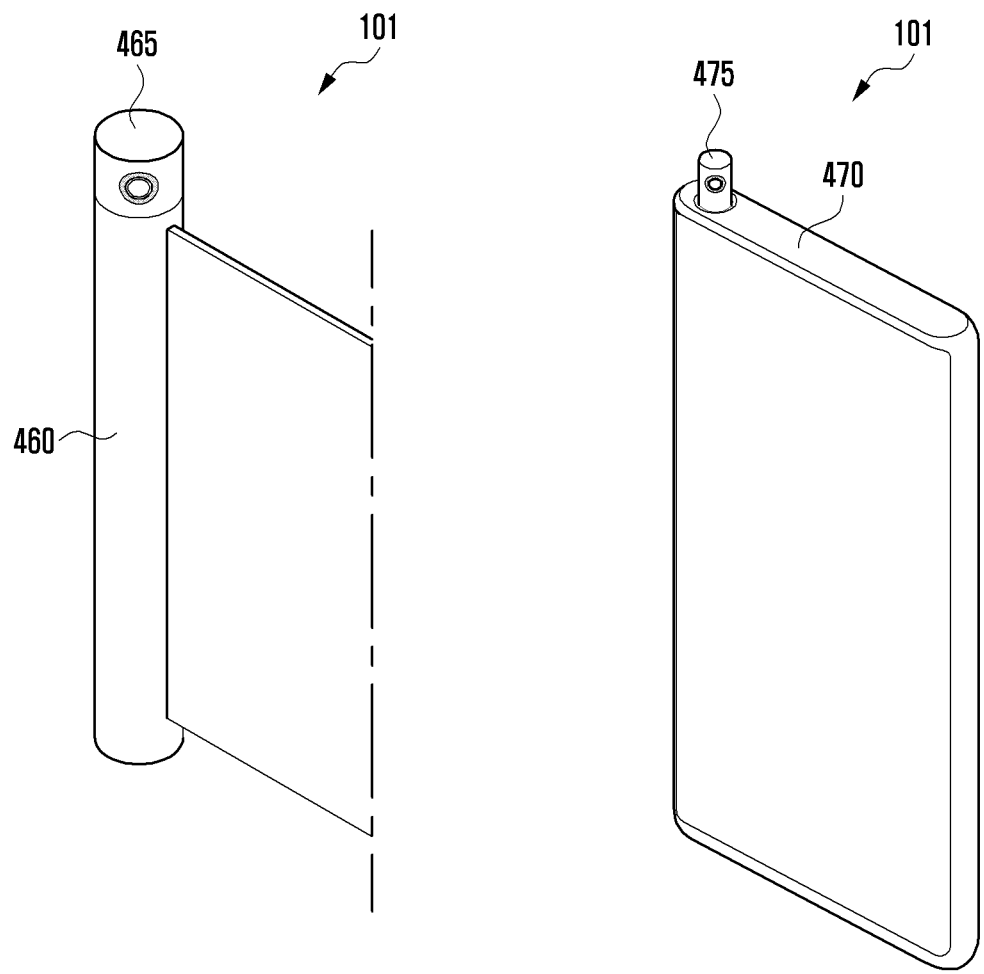

FIG. 4A and FIG. 4B are diagrams illustrating an example of an electronic device according to various embodiments.

FIG. 4A may show an example of various form factors of the electronic device 101 according to various display types. According to an embodiment, the electronic device 101 may include various form factors, such as rollable devices 410, 420, and 430 and/or a slidable device 440 capable of expanding the area of a display (e.g., the display module 160 in FIG. 1 or FIG. 2) in a rolling manner and/or a sliding manner. As illustrated in the example of FIG. 4A, the electronic device 101 may be implemented in various types, and the display and a camera module (e.g., the camera module 180 in FIG. 1 or FIG. 3) may be provided in various manners according to the implementation type of the electronic device 101.

According to an embodiment, the electronic device 101 (e.g., the rollable electronic devices 410, 420, and 430 and/or the slidable electronic device 440) may include a form factor in which a roll-up type display (e.g., a rollable display) is included in a housing. According to an embodiment, the electronic device 101 may indicate an electronic device in which a bending transform of the display (e.g., the display module 160 in FIG. 1) is possible and thus at least a part thereof is able to be wound or rolled, or to be received into a housing (not illustrated). According to a user's need, the electronic device 101 may extend and use a screen display region by unrolling the display (e.g., the display module 160 in FIG. 1) or exposing a wider area of the display to the outside. For example, the electronic device 101 may have an area of the display (e.g., the display module 160 in FIG. 1) exposed to the outside, the area changing according to an extent by which the display is unrolled by a user.

According to an embodiment, the electronic device 101 may include a housing structure for protecting a circularly rolled display, and may operate such that the display is opened (e.g., expanded) from the inside of the housing. For example, as illustrated in the example of the rollable electronic devices 410, 420, and 430 in FIG. 4A, a display may be received in a cylindrical housing, or as illustrated in the example of the slidable electronic device 440, at least a part of a display may be received through a separate cylindrical housing in a flat housing.

The electronic device 101 may, as illustrated in an example of FIG. 4B, include a camera module 465 (e.g., the camera module 180 in FIG. 1 or FIG. 3) which is rotatable independently to a housing 460 (e.g., a cylindrical housing)

of the electronic device 101, or may include a camera module 475 (e.g., the camera module 180 in FIG. 1 or FIG. 3) which is received in a housing 470 (e.g., a flat housing) of the electronic device 101. For example, the electronic device 101 may include a structure in which the camera module 465 is separated to be independently rotatable at one end (e.g., an upper end or a lower end) of the housing 460 of the electronic device, and thus the camera module 465 is rotatable in a designated direction at the upper end of the housing 460 according to rolling (or sliding) of the display module 160.

As another example, the electronic device 101 may include a structure in which the camera module 475 is received in a region of an upper end of the housing 470 of the electronic device, the camera module 475 (e.g., a pop-up camera) is popped up from the housing 470 at the time of operation of the camera module 475 or rolling (or sliding) of the display module 160, and the camera module 475 is rotatable in a designated direction at the upper end of the housing 470 according to rolling (or sliding) of the display module 160.

For example, the electronic device 101 may separately operate the part of the camera module 465 or 475, and may include an element (e.g., a connection member, and a drive unit (e.g., a motor) and/or a mechanical structure (e.g., a gear) for controlling rotation of the camera module 465 or 475) for internal connection of the camera module 465 or 475. For example, although not illustrated in the drawing, the electronic device 101 may include at least some of the elements of the electronic device 101 in FIG. 1, mounted in the housing 460 or 470.

According to various embodiments, a state change (e.g., an open state, an intermediate state, and a closed state) of the display module 160 in the electronic device 101 may be accomplished manually by a user, or may be automatically accomplished through a driving mechanism (e.g., a drive motor, a reduction gear module, and/or a gear assembly) disposed in the housing 460 or 470. According to an embodiment, an operation of the driving mechanism may be triggered based on a user input.

A user input for triggering an operation of the driving mechanism may include a touch input, a force touch input, and/or a gesture input via the display module 160. For example, when a signal is generated from various sensors such as a pressure sensor, the electronic device 101 may be switched from a closed state to an open state, or from an open state to a closed state. For example, a squeeze gesture indicating that a part (e.g., the palm or a finger) of a hand presses the electronic device 101 within a designated section thereof may be detected via a sensor when the electronic device 101 is carried or held by the hand, and accordingly, the electronic device 101 may be switched from a closed state to an open state or from an open state to a closed state. In another embodiment, a user input for triggering an operation of the driving mechanism may include a speech input (or voice input), or an input on a physical button visually exposed to the outside of the housing 460 or 470.

According to various embodiments, the electronic device 101 may be implemented as a device capable of expanding a display area of the display in a rolling (or sliding) manner, and rotating the camera module 180 (or adjusting the angle thereof), based on the expansion of the area of the display, as illustrated in the examples of FIG. 4A and FIG. 4B.

Figure 5:
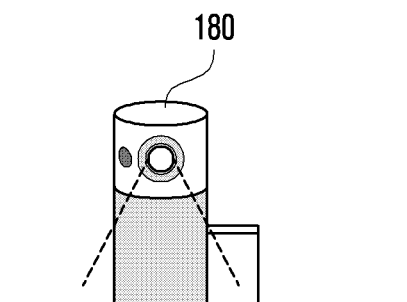
FIG. 5 is a diagram illustrating adjusting of the angle of a camera module in an electronic device according to various embodiments.
Figure 5:
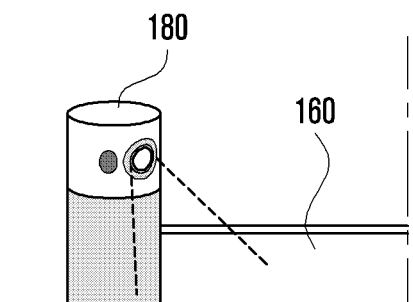

FIG. 5 is a diagram illustrating an example of adjusting the angle of a camera module in an electronic device according to various embodiments.

According to an embodiment, FIG. 5 shows an example in which, in the electronic device 101 having a structure illustrated in the example of FIG. 4B, the camera module 180 rotates in a designated direction by a designated angle according to rolling of the display module 160. In an embodiment, the designated angle by which the camera module 180 rotates may be defined in proportion to, for example, a rolling state (e.g., a discharged amount/an introduced amount) according to rolling of the display module 160. For example, the designated angle may include a rotation angle and/or a rotation direction of the camera module 180, which may be calculated based on a distance (or a discharged amount/an introduced amount) by which the display module 160 is rolled.

In an embodiment, example <501> may illustrate a state where the camera module 180 faces a first designated direction (e.g., a basic direction before rotation) in a closed state (or a reduced state) of the display module 160. In an embodiment, example <503> may illustrate a state where the camera module 180 faces a second designated direction (e.g., a direction adjusted according to rotation by a particular angle) in an open state (or an expansion state) according to rolling of the display module 160.

Figure 6A:
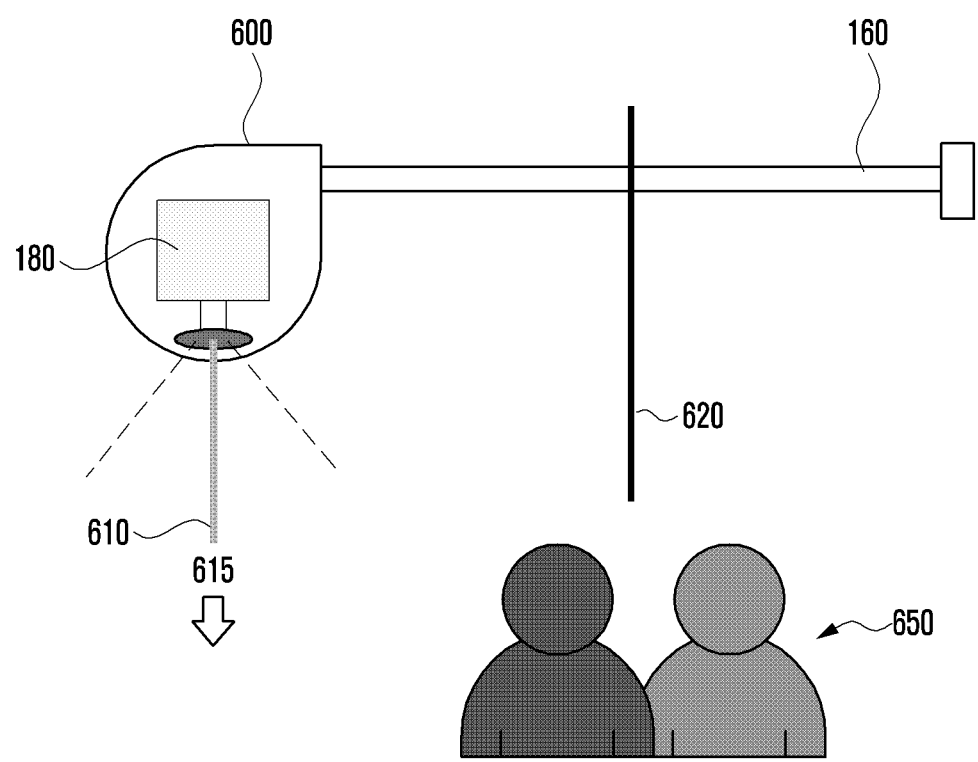
FIG. 6A and FIG. 6B are diagrams showing examples of interaction between a display module and a camera module in an electronic device.
Figure 6B:
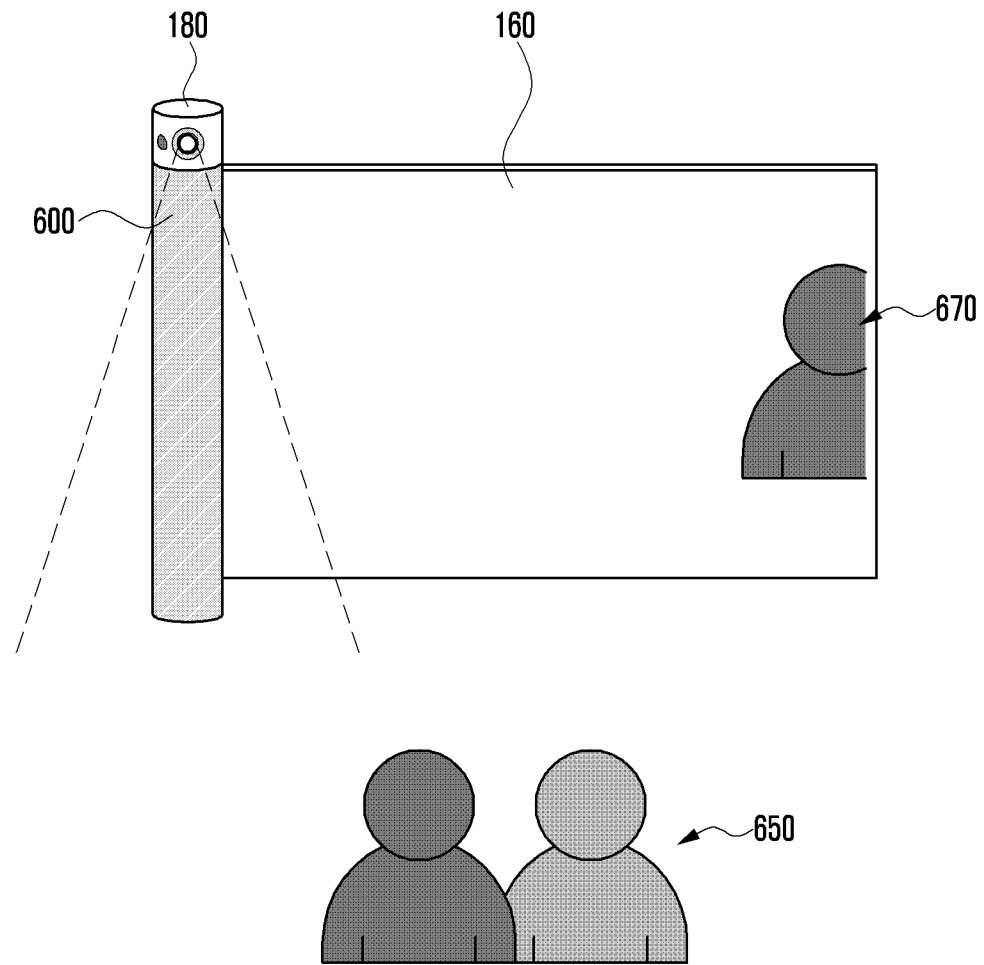

FIG. 6A and FIG. 6B are diagrams showing an example of interaction between a display module and a camera module in an electronic device.

FIG. 6A illustrates an operation of the conventional electronic device 101 in which the camera module 180 maintains a first designated direction at the time of expansion of the display module 160.

As illustrated in the example of FIG. 6A, in a state (e.g., a display area expansion state) where a user 650 opens the display module 160 from a housing 600 in the electronic device 101, the user 650 may be positioned on a central axis 620 of the display module 160 rather than being positioned on a central axis 610 of the camera module 180. For example, the user 650 may be positioned in a front direction corresponding to the central axis 620 of the display module 160 in order to identify an image displayed on the display module 160. For example, while the display module 160 is being opened and unrolled, when the user 650 operates the camera module 180 (e.g., the front camera) (e.g., takes a selfie or makes a video call), an image (e.g., a preview or a video call image) displayed on the display module 160 may become eccentric due to the difference between the central axis 610 of the camera module 180 and the central axis 620 of the display module 160. An example thereof is illustrated in FIG. 6B.

FIG. 6B illustrates an example for eccentricity of a subject image 670 displayed via the display module 160 in a case where the central axis 610 of the camera module 180 of the electronic device 101 is fixed. As illustrated in FIG. 6A and FIG. 6B, in a case where the user 650 (e.g., a subject) is positioned in the central axis 620 of the display module 160 and uses the camera module 180 (e.g., the front camera), inclusion of the entirety of the user 650 (e.g., a subject) in a predetermined field of view of the camera module 180 may not be possible in a first designated direction 615 which the central axis 610 of the camera module 180 faces, and there may occur an eccentricity problem in that the subject image 670 displayed on the display module 160 is biased to one side and a part or the entirety of the user 650 (e.g., a subject) is not displayed.

In various embodiments, in an environment described above, the central axis 610 of the camera module 180 may be rotated by a particular angle toward a direction in the user 650 (e.g., a subject) is positioned, in response to rolling of the display module 180, so that the subject image 670 is positioned in the center of the display module 160. An example thereof is illustrated in FIG. 7 and FIG. 8.

Figure 7:
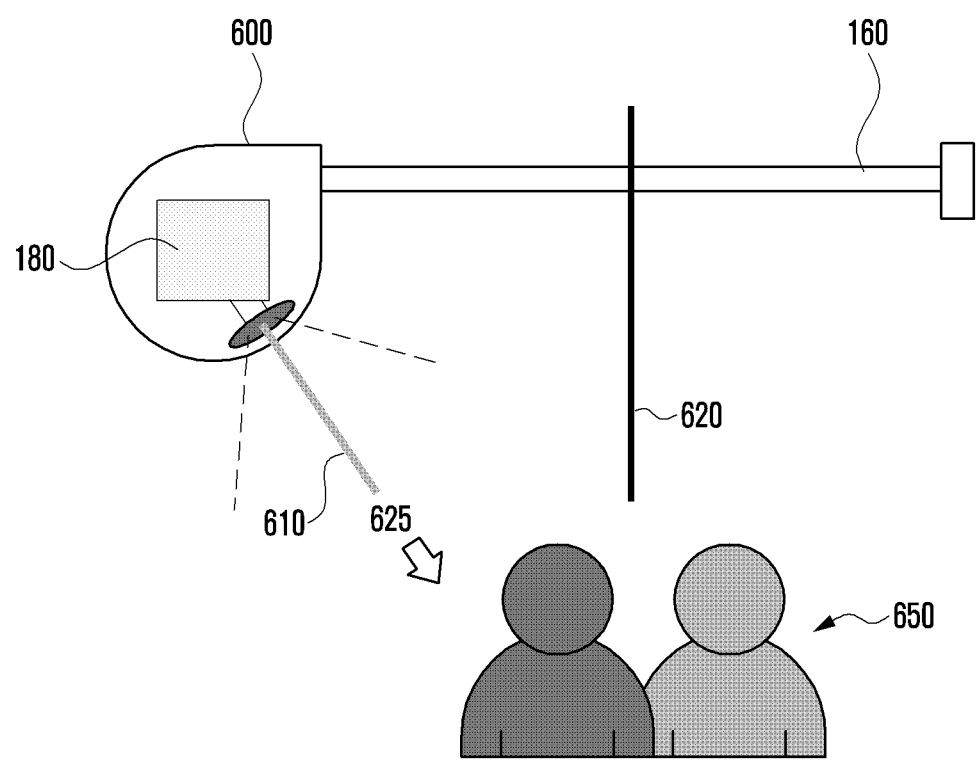
FIG. 7 and FIG. 8 are diagrams showing examples of interaction between a display module and a camera module in an electronic device according to various embodiments.
Figure 8:
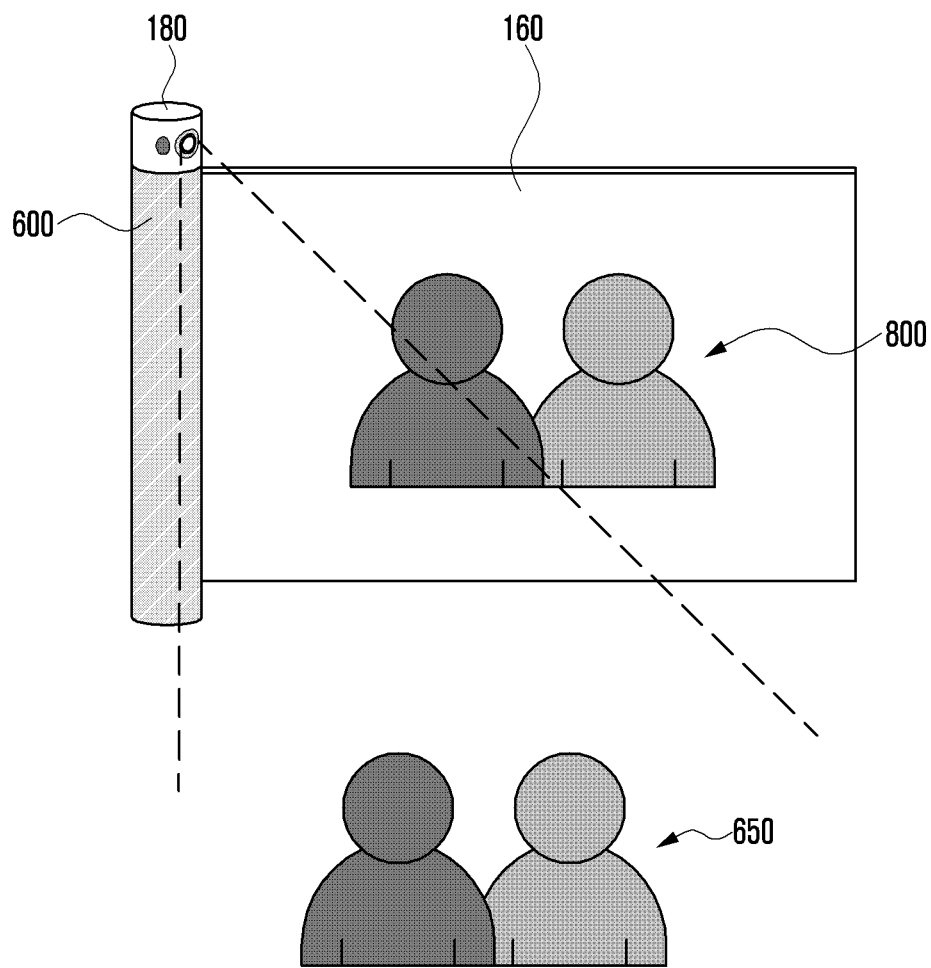

FIG. 7 and FIG. 8 are diagrams showing an example of interaction between a display module and a camera module in an electronic device according to various embodiments.

According to an embodiment, FIG. 7 illustrates an operation of the electronic device 101 of the disclosure in which the camera module 180 is adjusted by a particular angle (or is rotated) from the first designated direction 615 to a second designated direction 625 at the time of expansion of the display module 160.

According to an embodiment, FIG. 7 shows an example of operating a single camera (e.g., the camera module 180) in the electronic device 101. For example, in FIG. 7, the electronic device 101 may be a rollable electronic device capable of expanding a display area of the display module 160 in a rolling (or sliding) manner, and may be implemented such that the camera module 180 is mounted in one housing 600. According to an embodiment, the electronic device 101 may include the housing 600, the display module 160 disposed to be received in the housing 600, and the camera module 180 separately designed at an upper end of the housing 600. Although not illustrated in the drawing, the electronic device 101 may include at least some of the elements of the electronic device 101 in FIG. 1, mounted in the housing 600.

According to an embodiment, the example of FIG. 7 may show the electronic device 101 in a state (e.g., an open state or an expansion state) where the display area of the display module 160 has been expanded. According to an embodiment, the electronic device 101 may provide various display areas of the display module 160 according to a movement distance (or a movement position) of the display module 160 from the housing 600. For example, a user may adjust the display area (e.g., a display region or an active region) of the display module 160 of the electronic device 101 according to a use environment by using a rollable characteristic. For example, the display module 160 is a flexible display (e.g., a rollable display), and may include a display region (or active region (area)) outputting visual information. The display module 160 may have a display region changeable according to transformation (e.g., a rolling state) of the display module 160.

According to an embodiment, the electronic device 101 may include a sliding structure related to the display module 160. For example, the electronic device 101 may be implemented such that the display module 160 is rollable (or slidable) from the housing 600.

According to an embodiment, when the display module 160 is moved by a configured distance due to external force, the electronic device 101 may be switched from a closed state to an open state or an open state or a closed state with no more external force due to an elastic structure included in the sliding structure (e.g., a semi-automatic sliding operation). According to an embodiment, although not illustrated, there may further exist, in the electronic device 101, a state where only a part of the display module 160 has been expanded, that is, an intermediate state which is intermediate between the closed state and the open state. For example, the intermediate state may include a free stop state. According to an embodiment, the electronic device 101 may perform a first movement from a closed state to an intermediate state due to an elastic structure included in the sliding structure, and perform a second movement from the intermediate state to an open state due to an additional input (or external force).

According to an embodiment, when a signal is generated via an input device, the electronic device 101 may provide a rotational force to be switched from a closed state to an open state or from an open state to a closed state via a drive device (e.g., a motor) connected to the display module 160. For example, when a signal is generated through a hardware button or a software button provided through a screen, the electronic device 101 may be switched from a closed state to an open state or from an open state to a closed state.

According to an embodiment, the display module 160 may include a bendable section. For example, when the electronic device 101 is switched from a closed state to an open state, the bendable section may slide to be discharged from an inner space of the housing 600 of the electronic device 101, and thus the display area of the display module 160 may be expanded. As another example, when the electronic device 101 is switched from an open state to a closed state, at least a part of the bendable section may slide to be introduced into the inner space of the housing 600 of the electronic device 101, and thus the display area of the display module 160 may be reduced.

According to an embodiment, FIG. 7 illustrates an example implementing a structure in which the display module 160 is received in one housing 600, but embodiments of the disclosure are not limited thereto. For example, the electronic device 101 may include a first housing and a second housing, and may be implemented such that the display module 160 is received in the first housing and the second housing. For example, it has been illustrated that, in the electronic device 101, a part of the display module 160 is exposed from the housing 600. However, the electronic device 101 may be implemented such that the display module 160 is received in the first housing and the second housing and exposed from the first housing and the second housing.

According to an embodiment, the electronic device 101 has been described to be rolled in a single direction as illustrated in FIG. 7, but may also be implemented as a bidirectional rollable electronic device in which the display module 160 is rolled into and received in the first housing and the second housing. For example, the electronic device 101 may be implemented such that the display module 160 is rolled into and received in the first housing and/or the second housing.

According to an embodiment, the housing 600 in FIG. 7 has been illustrated as having a cylindrical shape as an example, but is not limited thereto. The housing 600 may be implemented in various types enabling the display module 160 to be rolled and received therein.

According to an embodiment, the camera module 180 may be rotatably attached (or mounted) to the upper end of the housing 600. According to an embodiment, the camera module 180 may operate while facing the first designated direction in a closed state of the display module 160. According to an embodiment, the camera module 180 may, in an open state of the display module 160, rotate from the first designated direction to face the second designated direction and operate.

As illustrated in the example of FIG. 7, in a state (e.g., a display area expansion state) where a user 650 opens the display module 160 in the electronic device 101, the user 650 may be positioned on the central axis 620 of the display module 160 rather than being positioned on the central axis 610 of the camera module 180. For example, the user 650 may be positioned in a front direction corresponding to the central axis 620 of the display module 160 in order to identify an image displayed on the display module 160. For example, while the display module 160 is being opened and unrolled, when the user 650 operates the camera module 180 (e.g., the front camera) (e.g., takes a selfie or makes a video call), the camera module 180 may be rotated by a designated angle so that the camera module 180 faces the second designated direction 625 from the first designated direction 615.

For example, the electronic device 101 may allow (or control) the central axis 610 of the camera module 180 and the central axis 620 of the display module 160 to meet with each other in a direction corresponding to the user 650, so as to remove eccentricity of an image (e.g., a preview or a video call image) displayed on the display module 160 and position the image in the center of the display module 160. An example thereof is illustrated in FIG. 8.

According to an embodiment, FIG. 8 illustrates an example in which a subject image 800 displayed via the display module 160 is positioned in the center of the display module 160, based on rotation of the camera module 180 in the electronic device 101. As illustrated in FIG. 7 and FIG. 8, in a case where the user 650 (e.g., a subject) is positioned in the central axis 620 of the display module 160 and uses the camera module 180 (e.g., the front camera), the central axis 610 of the camera module 180 may be rotated from the first designated direction 615 to the second designated direction 625, so that the entirety of the user 650 (e.g., a subject) may be included in a predetermined field of view of the camera module 180, and in the subject image 800 displayed on the display module 160, the entirety of the user 650 (e.g., a subject) may be displayed in the center of the display module 160.

According to an embodiment, the electronic device 101 may control the direction of the central axis of the camera module 180 to be moved (e.g., rotated) in proportion to an amount (e.g., a discharged amount/an introduced amount) by which the area of the display is increased according to rolling of the display module 160. For example, as illustrated in the example of FIG. 7 and FIG. 8, the electronic device 101 may control rotation (or angle change) of the camera module 180 and/or the direction thereof such that the central axis 610 of the camera module 180 is oriented toward the central axis 620 of the display module 160 according to an increase of a distance by which the display module 160 is rolled.

According to an embodiment, the electronic device 101 may allow the user 650 (e.g., a subject) positioned in the central axis 620 of the display module 160, to be positioned in the central axis 610 of the camera module 160. According to an embodiment, the electronic device 101 may capture an image of a side of the user 650 rather than the front thereof in response to rotation (or angle change) of the camera module 180, and may include a separate indicating lamp (e.g., LED or flash) adjacent to the camera module 180 to provide a guide for the image capturing to the user 650.

Figure 9:
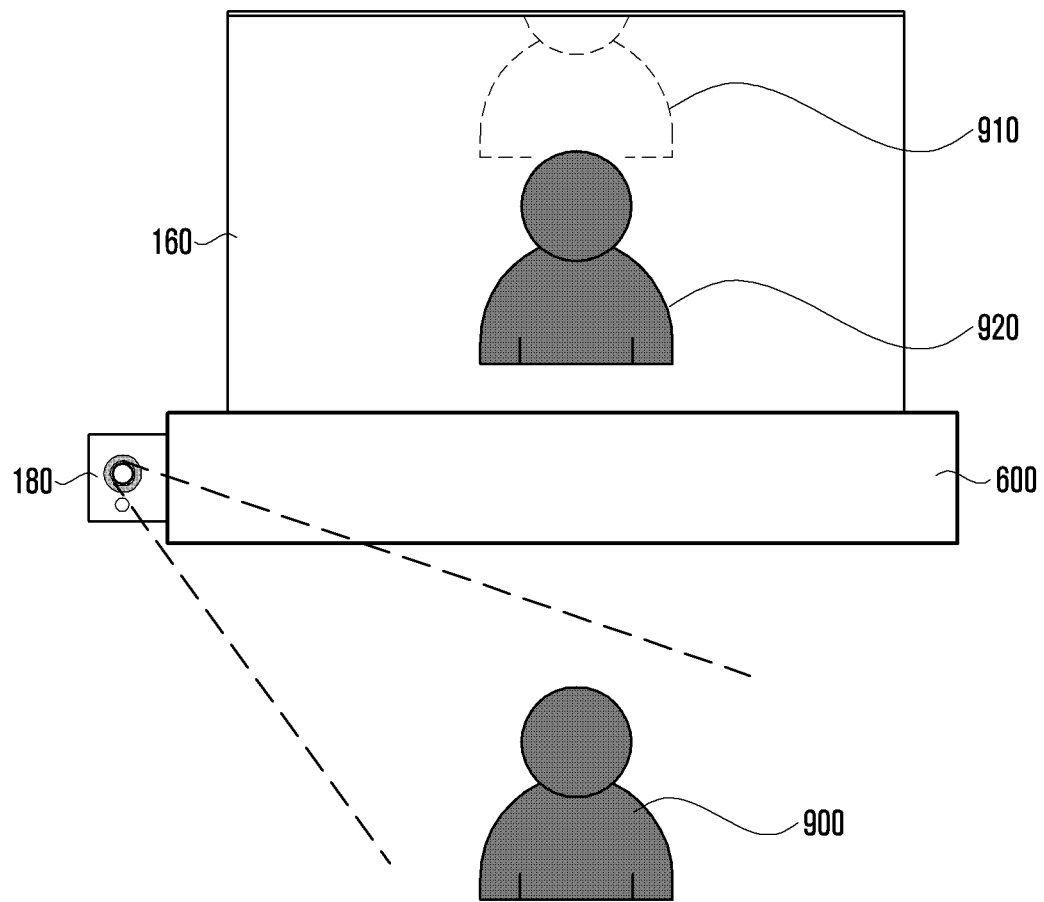
FIG. 9 is a diagram showing an example of interaction between a display module and a camera module in an electronic device according to various embodiments.

FIG. 9 is a diagram showing an example of interaction between a display module and a camera module in an electronic device according to various embodiments.

According to an embodiment, FIG. 9 illustrates an example of a structure in which the electronic device 101 includes a large screen display module 160, the electronic device 101 is a display device (e.g., a rollable TV) capable of expanding a display area of the display module 160 in a vertical direction in a rolling (or sliding) manner, and the camera module 180 is mounted on a lateral surface of the housing 600. According to an embodiment, the electronic device 101 may include the housing 600, the display module 160 disposed to be received in the housing 600, and the camera module 180 separately designed on a lateral surface of the housing 600.

According to an embodiment, as illustrated in the example of FIG. 9, the camera module 180 may be vertically rotated on a lateral surface of the housing 600. Although not illustrated in the drawing, the electronic device 101 may include at least some of the elements of the electronic device 101 in FIG. 1, mounted in the housing 600. According to an embodiment, the electronic device 101 as illustrated in the example of FIG. 9 may control the direction of the central axis of the camera module 180 to be moved (e.g., rotated) in proportion to an amount (e.g., a discharged amount/an introduced amount) by which the area of the display is increased according to vertical rolling of the display module 180, and the operation thereof may correspond to FIG. 7 and FIG. 8.

According to an embodiment, the example of FIG. 9 may show the electronic device 101 in a state (e.g., an open state or an expansion state) where the display area of the display module 160 has been expanded. According to an embodiment, FIG. 9 illustrates an example implementing a structure in which one camera module 180 is mounted on one lateral surface of one housing 600, but embodiments of the disclosure are not limited thereto. For example, the electronic device 101 may be implemented such that the camera module 180 is mounted on each of both lateral surfaces of the housing 600.

According to an embodiment, the camera module 180 may be rotatably attached (or mounted) to a lateral surface of the housing 600. According to an embodiment, the camera module 180 may operate while facing a first designated direction in a closed state of the display module 160. According to an embodiment, the camera module 180 may, in an open state of the display module 160, rotate from the first designated direction to a second designated direction and operate while facing same.

As illustrated in the example of FIG. 9, the camera module 180 may be rotated by a designated angle so that the camera module 180 faces the second designated direction (e.g., a downward direction) from the first designated direction (e.g., a front direction). For example, the electronic device 101 may allow (or control) the central axis of the camera module 180 and the central axis of the display module 160 to meet with each other in a direction corresponding to the user 900, so as to remove eccentricity of an image (e.g., a preview or a video call image) displayed on the display module 160 and position the image in the center of the display module 160.

As illustrated in the example of FIG. 9, a subject image displayed via the display module 160 may be positioned and displayed in the center of the display module 160, based on rotation of the camera module 180, like the position of a second subject image 920 from the position of a first subject image 910. For example, the central axis of the camera module 180 may be rotated from the first designated direction to the second designated direction so that the entirety of a user 900 (e.g., a subject) is included in a predetermined field of view of the camera module 180, and the subject image 920 displayed on the display module 160 displays the entirety of a user 900 (e.g., a subject) in the center of the display module 180.

According to an embodiment, the electronic device 101 may track a movement of the user 900 by using sensing data based on various sensors, and may rotate the camera module 180 to correspond to the change (e.g., the change in the level of TV watching) of the position of the user 900, based on the tracking of the movement of the user 900. Therefore, the electronic device 101 may continuously display the subject image 920 displayed on the display module 160, in the center of the display module 180.

The electronic device 101 according to an embodiment of the disclosure may include a flexible display (e.g., the display module 160 in FIG. 1 or FIG. 2), at least one camera module (e.g., the camera module 180 in FIG. 1 or FIG. 3), and the processor 120 operatively connected to the flexible display and the camera module, wherein the processor 120 is configured to detect operation initiation of a front camera of the camera module, identify a rolling state of the flexible display, based on the operation initiation, rotate the camera module toward a designated direction, based on the rolling state of the flexible display, and based on the rolling state of the flexible display, display an image obtained from the designated direction via the camera module in a center of the flexible display.

According to an embodiment of the disclosure, the processor 120 may perform control to identify a rotation angle of the camera module, based on the rolling state of the flexible display, and rotate the camera module toward a designated direction, based on the rotation angle of the camera module.

According to an embodiment of the disclosure, the processor 120 may determine whether the flexible display is in an open state or a closed state at a time of the operation initiation of the front camera.

According to an embodiment of the disclosure, the processor 120 may control the front camera to operate in a first designated direction in case that the flexible display is in the closed state, and control the front camera to operate in a second designated direction in case that the flexible display is in the open state.

According to an embodiment of the disclosure, the processor 120 may perform control to monitor a rolling state of the flexible display, based on switching of the flexible display from the closed state to the open state, and rotate the front camera toward the second designated direction, based on the rolling state of the flexible display.

According to an embodiment of the disclosure, the processor 120 may determine a rotation angle corresponding to the rolling state of the flexible display, and rotate the front camera toward the second designated direction, based on the rotation angle, and the rotation angle may be determined at least based on a movement distance of the flexible display and a focal distance of the front camera.

According to an embodiment of the disclosure, the processor 120 may perform control to, in response to the open state of the flexible display, rotate the front camera toward a central axis direction of the flexible display to cause a subject positioned on a central axis of the flexible display to be positioned on a central axis of the front camera.

According to an embodiment of the disclosure, the processor 120 may control the front camera to be rotated by an angle proportional to a movement distance of the flexible display so as to face the second designated direction.

According to an embodiment of the disclosure, the processor 120 may control, based on the rotation of the front camera, the flexible display to display an image of a subject obtained via the front camera in a center of the flexible display.

According to an embodiment of the disclosure, the processor 120 may track a subject from an image obtained via the front camera in case that the flexible display is in the open state, and determine whether to rotate the front camera, based on a position of the subject obtained by the tracking of the subject.

According to an embodiment of the disclosure, the processor 120 may, in case that it is determined that the position of the subject is in front of the front camera, determine not to rotate the front camera to cause the front camera to operate in the first designated direction, and in case that it is determined that the position of the subject is not in front of the front camera, determine to rotate the front camera to cause the front camera to operate in the second designated direction.

According to an embodiment of the disclosure, the processor 120 may perform control to, at a time of selfie taking or a video call using the front camera, rotate an angle of the front camera in proportion to the rolling state of the flexible display.

According to an embodiment of the disclosure, the electronic device 101 may include a housing capable of receiving the flexible display, and the camera module may be disposed to be rotatable toward a designated direction at one end of the housing.

According to an embodiment of the disclosure, the camera module may be disposed to be received in the housing, and be popped up from the housing at the time of the operation initiation to be rotatable toward a designated direction at one end of the housing.

Hereinafter, an operation method of the electronic device 101 will be described in detail. Operations performed in the electronic device 101 described below may be executed by the processor 120 including at least one processing circuitry of the electronic device 101. According to an embodiment, the operations performed by the electronic device 101 may be stored in the memory 130, and may be executed by instructions which, when executed, cause the processor 120 to operate.

Figure 10:
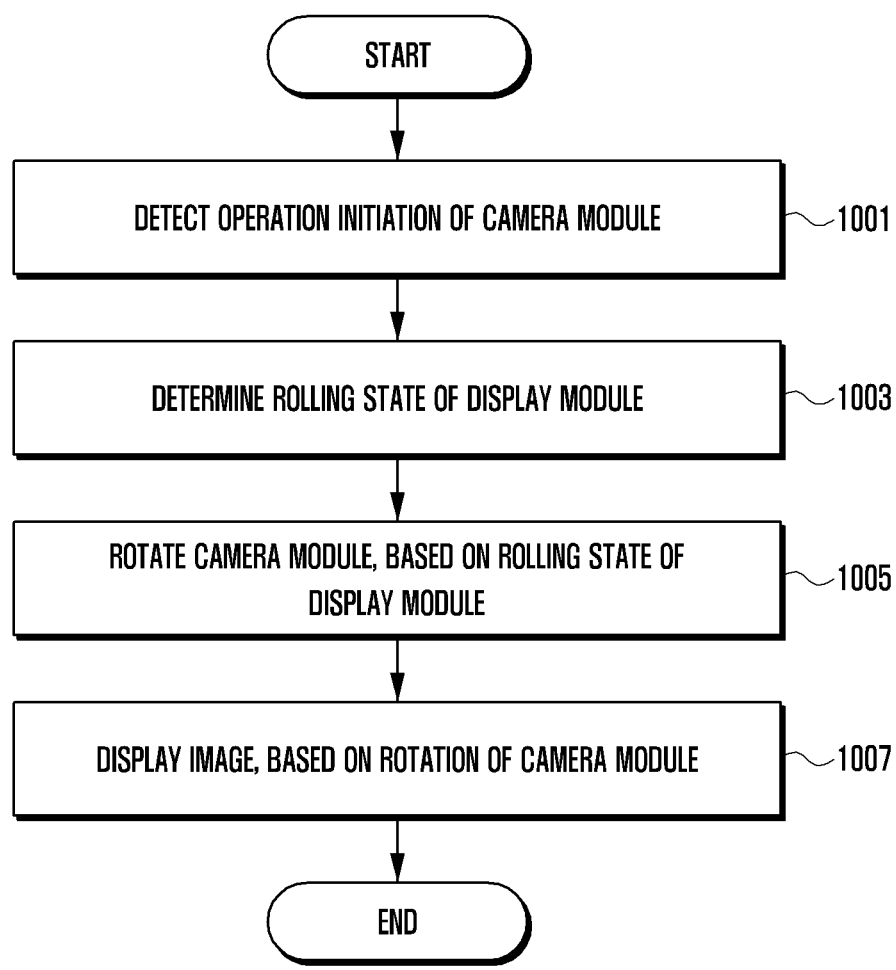
FIG. 10 is a flow diagram illustrating an exemplary process of operating an electronic device according to various embodiments.

FIG. 10 is a flowchart illustrating an operation method of an electronic device according to various embodiments.

Referring to FIG. 10, in operation 1001, the processor 120 of the electronic device 101 may detect initiation of an operation of the camera module 180. According to an embodiment, a user may make a user input (e.g., manipulation of the electronic device 101) for activating the camera module 180 of the electronic device 101, and the processor 120 may detect initiation of an operation of the camera module 180, based on the user input for activation of the camera module 180.

According to an embodiment, the user input may include, for example, an input on a button (e.g., a physical button and/or a software button) provided for activating the camera module 180 of the electronic device 101, or an input (e.g., a touch) on an application icon for executing a camera application or a video call application.

According to an embodiment, the operation of the camera module 180 may include a trigger operation in which the front camera of the camera module 180 is activated and, for example, may include an operation in which selfie capturing or a video call is performed. For example, the processor 120 may control the camera module 180 to activate the front camera, based on detection of a trigger operation.

According to an embodiment, in a case where initiation of an operation of the camera module 180 is detected, the processor 120 may further include an operation of determining whether the operation initiation corresponds to an operation of the front camera of the camera module 180 or an operation of the rear camera of the camera module 180. For example, in a case where the operation initiation corresponds to initiation of an operation of the front camera, the processor 120 may proceed with operation 1003 and perform operation 1003 and others. As another example, in a case where the operation initiation corresponds to initiation of an operation of the rear camera, the processor 120 may not perform operations in FIG. 10 and may perform an operation of capturing an image of a subject via the rear camera according to a user input.

In operation 1003, the processor 120 may determine a rolling state of the display module 160. According to an embodiment, when an operation of the camera module 180 (e.g., the front camera) is initiated, the display module 160 may be in an open state (or an expansion state, an opened state, or an unrolled state), in other words, a state in which the display module 160 is not able to be expanded no more by being rolled (or slid out). According to an embodiment, when an operation of the camera module 180 (e.g., the front camera) is initiated, the display module 160 may be in a closed state (or a reduced state), in other words, a state in which the display module 160 has not been rolled (or slid out) (or expanded).

According to an embodiment, sliding out may indicate that, when the display module 160 of the electronic device 101 is switched from a closed state to an open state, the display module 160 is at least partially moved (or rolled) in a third designated direction (the right direction when the user looks at the display module 160). According to another embodiment, sliding in may indicate that, when the display module 160 of the electronic device 201 is switched from an open state to a closed state, the display module 160 is moved (or rolled) in a fourth designated direction (the left direction when the user looks at the display module 160). For example, the third designated direction and the fourth designated direction of the display module 160 may be opposite to each other.

According to an embodiment, the open state may be defined as a state in which the display area of the display module 160 has been expanded compared to the closed state. According to an embodiment, the processor 120 may determine a first rolling state that is an open state of the display module 160, or a second rolling state in which the display module is being rolled from a closed state to the open state, based on detection of initiation of an operation of the camera module 180 (e.g., the front camera). For example, the first rolling state may correspond to a state where the display module 160 is opened, and the second rolling state may correspond to a state where the display module 160 is being switched from a closed state to an open state while being rolled or by being rolled.

In operation 1005, the processor 120 may control rotation of the camera module 180, based on a rolling state of the display module 160. According to an embodiment, the processor 120 may, in response to an open state of the display module 160, control the camera module 180 to be rotated toward the direction (e.g., the second designated direction 625 of FIG. 9) of the central axis of the display module 160 so that a subject (e.g., the subject 650 in FIG. 9) positioned in the central axis (e.g., the central axis 620 in FIG. 9) of the display module 160 is positioned in the central axis (e.g., the central axis 610 in FIG. 9) of the camera module 180.

According to an embodiment, the processor 120 may generate a driving signal to a drive unit (e.g., a motor) for driving rotation of the camera module 180, so as to control the camera module 180 (e.g., the housing of the camera module 180) such that the camera module 180 is rotated by a designated angle (e.g., an angle proportional to a movement (or rolling) distance (or a discharged amount/an introduced amount) of the display module 160). According to an embodiment, the designated angle may be defined based on a movement distance (D1) of the display module 160 and a focal distance (D2) (or an actual user distance) of the camera module 180 as in examples of <Equation 1> and/or <Equation 2> below.

$$\operatorname{Tan} \phi = \frac{\text{Display module movement distance }(D1)}{\text{Camera module focal distance }(D2)} \quad \text{[Equation 1]}$$

$$\phi = \tan^{-1} \frac{\text{Display module movement distance }(D1)}{\text{Camera module focal distance }(D2)} \quad \text{[Equation 2]}$$

For example, a designated angle by which the camera module 180 is required to be rotated, a rotation angle degree of the camera module 180 may be calculated by defining the focal distance (D2) of the camera module 180 and the movement distance (D1) of the display module 160 in trigonometry. According to an embodiment, in a case of a subject having the focal distance of the camera module 180 equal to or greater than a designated distance (e.g., in a case where a focal distance is far from a subject like sky or trees), angle correction for the camera module 180 may be pointless, and thus an existing state (e.g., a state before correction or a state before rotation) may be maintained.

In operation 1007, the processor 120 may display an image on the display module 160, based on rotation of the camera module 180. According to an embodiment, the processor 120 may control the display module 160 to display an image of a subject obtained via the camera module 180 in the center of the display module 160, based on rotation of the camera module 180.

Figure 11:
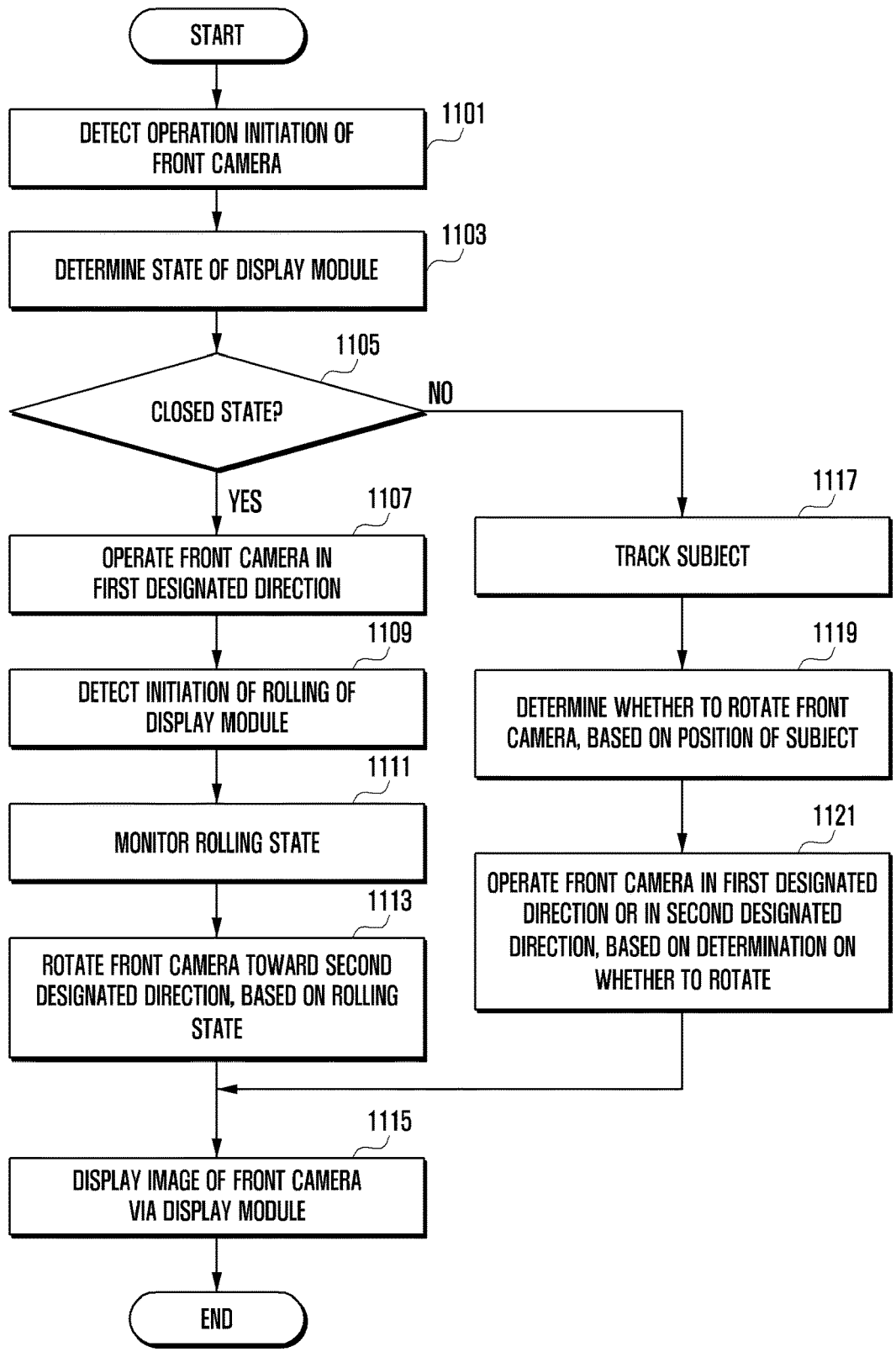
FIG. 11 is a flow diagram illustrating an exemplary process for operating an electronic device according to various embodiments.

FIG. 11 is a flowchart illustrating an operation method of an electronic device according to various embodiments.

According to an embodiment, FIG. 11 may show an operation example in an environment, such as a selfie capturing or a video call, in which a user uses the front camera of the camera module 180. For example, FIG. 11 may show an example in which the electronic device 101 corrects the angle of the camera module 180 (e.g., the front camera) in response to a central axis change (e.g., a movement from the central axis of the camera module 180 to the central axis of the display module 160) of a user, which occurs according to rolling (or sliding out) for switching the display module 160 to be in an open state.

Referring to FIG. 11, in operation 1101, the processor 120 of the electronic device 101 may detect initiation of an operation of a front camera. According to an embodiment, a user may make a user input for activating the front camera of the electronic device 101, and the processor 120 may detect initiation of an operation of the front camera, based on the user input for activation of the front camera. According to an embodiment, the operation of the front camera may include an operation in which selfie capturing or a video call is performed. For example, the processor 120 may control the camera module 180 to activate the front camera, based on detection of an operation of the front camera.

In operation 1103, the processor 120 may determine a state of the display module 160. According to an embodiment, when an operation of the front camera is initiated, the display module 160 may be in an open state or a closed state. According to an embodiment, the open state may be a state (e.g., an unrolled state) in which the display module 160 is not able to be expanded no more by being rolled (or slid out).

According to an embodiment, the closed state may be a state in which the display module 160 has not been rolled (or slid out) (or expanded).

In operation 1105, the processor 120 may determine whether the display module 160 is in a closed state or an open state, based on a result of determination of the state of the display module 160.

In operation 1105, when the display module 160 is in a closed state (e.g., "YES" in operation 1105), the processor 120 may operate the front camera in a first designated direction in operation 1107. According to an embodiment, the processor 120 may maintain a state where the front camera faces the first designated direction (e.g., a basic direction before rotation) as in example <501> of FIG. 5, in the closed state of the display module 160.

In operation 1109, the processor 120 may detect initiation of rolling of the display module 160. According to an embodiment, the processor 120 may detect an operation of the display module 160 being rolled (e.g., slid out) from a closed state to an open state.

In operation 1111, the processor 120 may monitor a rolling state (or a discharged amount) (e.g., a movement distance) of the display module 160. According to an embodiment, the processor 120 may calculate a rotation angle of the front camera, based on a distance (or discharged amount) by which the display module 160 is rolled.

In operation 1113, the processor 120 may control the front camera to be rotated toward a second designated direction, based on a rolling state of the display module 160. According to an embodiment, the processor 120 may, in response to an open state of the display module 160, control the camera module 180 to be rotated toward the direction (e.g., the second designated direction 625 of FIG. 9) of the central axis of the display module 160 so that a subject (e.g., the subject 650 in FIG. 9) positioned in the central axis (e.g., the central axis 620 in FIG. 9) of the display module 160 is positioned in the central axis (e.g., the central axis 610 in FIG. 9) of the front camera. According to an embodiment, the processor 120 may cause the front camera to be rotated by a designated angle (e.g., an angle proportional to a movement (or rolling) distance (or discharged amount) of the display module 160) and thus to face the second designated direction.

In operation 1115, the processor 120 may display an image of the front camera via the display module 160. According to an embodiment, the processor 120 may control the display module 160 to display an image of a subject obtained via the front camera in the center of the display module 160, based on rotation of the front camera.

In operation 1105, in a case where the display module 160 is in an open state (e.g., "NO" in operation 1105), the processor 120 may track a subject in operation 1117. According to an embodiment, the processor 120 may identify whether a subject (e.g., a user) is detected from an image obtained via the front camera.

In operation 1119, the processor 120 may determine whether to rotate the front camera, based on the position of the subject. According to an embodiment, in a case where it is determined, based on the tracking of the subject, that the position of the subject is in front of the front camera (is in the center of the display module 160), the processor 120 may determine not to rotate the front camera so that the front camera operates in the first designated direction. According to another embodiment, in a case where it is determined, based on the tracking of the subject, that the position of the subject is not in front of the front camera (is eccentric on the display module 160), the processor 120 may determine to rotate the front camera so that the front camera operates in the second designated direction.

In operation 1121, the processor 120 may control the front camera to operate in the first designated direction or in the second designated direction, based on determination on whether to rotate. For example, the processor 120 may rotate the front camera to face the second designated direction from the first designated direction when rotation of the front camera is determined.

In operation 1115, the processor 120 may display an image of the front camera. According to an embodiment, the processor 120 may control the display module 160 to display an image of a subject obtained via the front camera in the center of the display module 160, based on fixation or rotation of the front camera.

Figure 12:
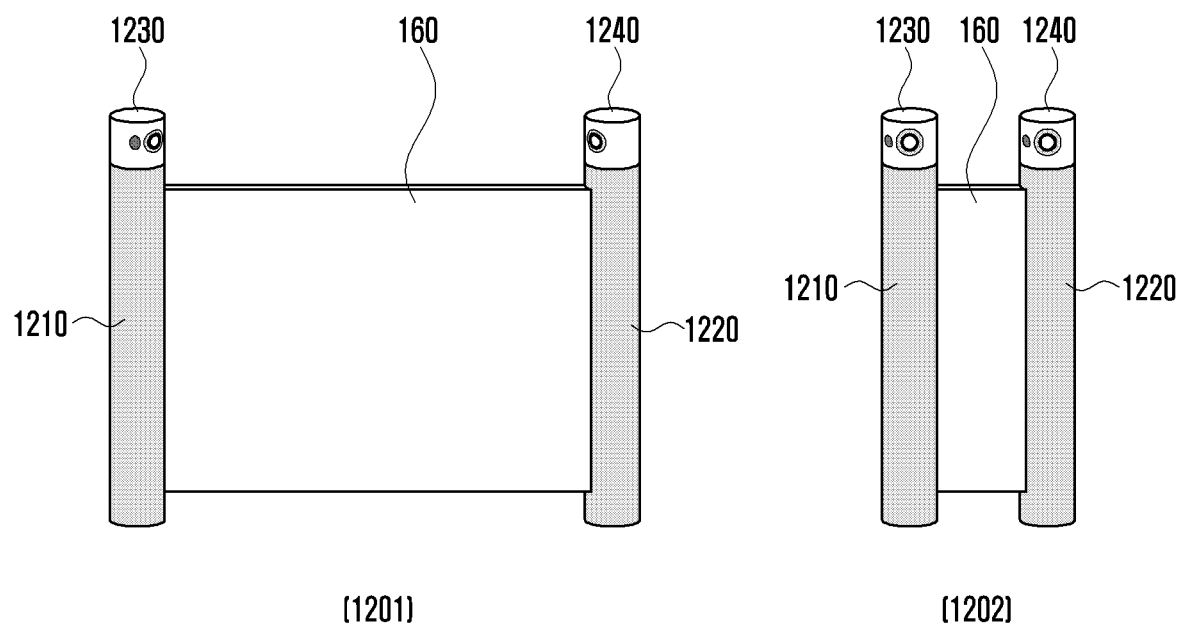
FIG. 12 is a diagram illustrating an example of operating a camera module in an electronic device according to various embodiments.

FIG. 12 is a diagram illustrating another example of operating a camera module in an electronic device according to various embodiments.

According to an embodiment, FIG. 12 shows an example of operating a dual camera (e.g., a first camera module 1230 and a second camera module 1240). For example, in FIG. 12, the electronic device 101 may be a rollable electronic device capable of expanding a display area of the display module 160 in a rolling (or sliding) manner, and may be implemented such that the camera modules 1230 and 1240 are mounted in two housings (e.g., a first housing 1210 and a second housing 1220), respectively. According to an embodiment, a user may perform stereoscopic image capturing (e.g., three-dimensional image capturing) by using the first camera module 1230 and a second camera module 1240.

According to an embodiment, the electronic device 101 may include the display module 160 disposed to be received in the first housing 1210, the second housing 1220, and at least a part of the first housing 1210 and the second housing 1220, the first camera module 1230 separately designed at an upper end of the first housing 1210, and the second camera module 1240 separately designed at an upper end of the second housing 1220. Although not illustrated in the drawing, the electronic device 101 may include at least some of the elements of the electronic device 101 in FIG. 1, mounted in the first housing 1210 and/or the second housing 1220.

In an embodiment, example <1201> may show the electronic device 101 in a state (e.g., an open state) where a display area of the display module 160 has been expanded. In an embodiment, example <1202> may illustrate the electronic device 101 in a state (e.g., a closed state) where a display area of the display module 160 has not been expanded.

According to an embodiment, when the electronic device 101 is switched from a closed state to an open state (e.g., is slid out), at least one of the first housing 1210 and the second housing 1220 may partially move toward a first direction (e.g., the direction of the central axis of the display module 160). According to another embodiment, when the electronic device 101 is switched from an open state to a closed state (e.g., is slid in), at least one of the first housing 1210 and the second housing 1220 may move toward a second direction opposite to the first direction.

According to an embodiment, the electronic device 101 may provide various display areas of the display module 160 according to a movement distance (or a movement position) of the display module 160 from the first housing 1210 and/or the second housing 1220. For example, a user may adjust the display area (e.g., a display region or an active region) of the display module 160 of the electronic device 101 according to a use environment by using a rollable characteristic. For example, the display module 160 is a flexible display, and may include a display region (or active region) outputting visual information. The display module 160 may have a display region changeable according to transformation (e.g., a rolling state) of the display module 160.

According to an embodiment, the electronic device 101 may include a sliding structure related to the display module 160. For example, the electronic device 101 may be implemented such that the display module 160 is rollable (or slidable) from at least one of the first housing 1210 and the second housing 1220.

According to an embodiment, when the display module 160 is moved by a configured distance due to external force, the electronic device 101 may be switched from a closed state to an open state or an open state or a closed state with no more external force due to an elastic structure included in the sliding structure (e.g., a semi-automatic sliding operation). According to an embodiment, although not illustrated, there may further exist, in the electronic device 101, a state where only a part of the display module 160 has been expanded, that is, an intermediate state which is intermediate between the closed state and the open state. For example, the intermediate state may include a free stop state. According to an embodiment, the electronic device 101 may perform a first movement from a closed state to an intermediate state due to an elastic structure included in the sliding structure, and perform a second movement from the intermediate state to an open state due to an additional input (or external force).

According to an embodiment, when a signal is generated via an input device, the electronic device 101 may provide a rotational force to be switched from a closed state to an open state or from an open state to a closed state via a drive device (e.g., a motor) connected to the display module 160. For example, when a signal is generated through a hardware button or a software button provided through a screen, the electronic device 101 may be switched from a closed state to an open state or from an open state to a closed state.

According to an embodiment, the display module 160 may include a bendable section. For example, when the electronic device 101 is switched from a closed state to an open state, the bendable section may slide to be discharged from an inner space of the first housing 1210 and/or the second housing 1220 of the electronic device 101, and thus the display area of the display module 160 may be expanded. As another example, when the electronic device 101 is switched from an open state to a closed state, at least a part of the bendable section may slide to be introduced into the inner space of the first housing 1210 and/or the second housing 1220 of the electronic device 101, and thus the display area of the display module 160 may be reduced.

According to an embodiment, the first housing 1210 and the second housing 1220 may be implemented in a combination structure in which they are able to be combined with each other, but embodiments of the disclosure are not limited thereto. For example, the electronic device 101 has been illustrated such that a part of the display module 160 is exposed in a state where the first housing 1210 and the second housing 1220 are combined. However, the electronic device 101 may be implemented such that the display module 160 is completely received in the first housing 1210 and the second housing 1220 and is not exposed therefrom.

According to an embodiment, the electronic device 101 has been described to be rolled in two directions as illustrated in FIG. 12, but may also be implemented as a uni-directional rollable electronic device in which the display module 160 is rolled into and received in one of the first housing 1210 or the second housing 1220. For example, the electronic device 101 may be implemented such that the display module 160 is rolled into and received in the first housing 1210 or is rolled into and received in the second housing 1220.

According to an embodiment, the first housing 1210 and the second housing 1220 in FIG. 12 have been illustrated as each having a cylindrical shape as an example, but are not limited thereto. The first housing 1210 and the second housing 1220 may be implemented in various types enabling the display module 160 to be rolled and received therein.

According to an embodiment, the first camera module 1230 may be rotatably attached (or mounted) to the upper end of the first housing 1210. According to an embodiment, the second camera module 1240 may be rotatably attached (or mounted) to the upper end of the second housing 1220. According to an embodiment, the first camera module 1230 and the second camera module 1240 may operate while facing a first designated direction in a closed state of the display module 160.

According to an embodiment, each of the first camera module 1230 and the second camera module 1240 may, in an open state of the display module 160, rotate from the first designated direction to a second designated direction and operate while facing same. According to an embodiment, the second designated direction of the first camera module 1230 and the second designated direction of the second camera module 1240 may be implemented to be symmetrical to each other (e.g., transversely symmetry). For example, rotation of the first camera module 1230 and rotation of the second camera module 1240 may be performed in opposite directions by substantially the same angle in proportional to a rolling state of the display module 160.

Figure 13:
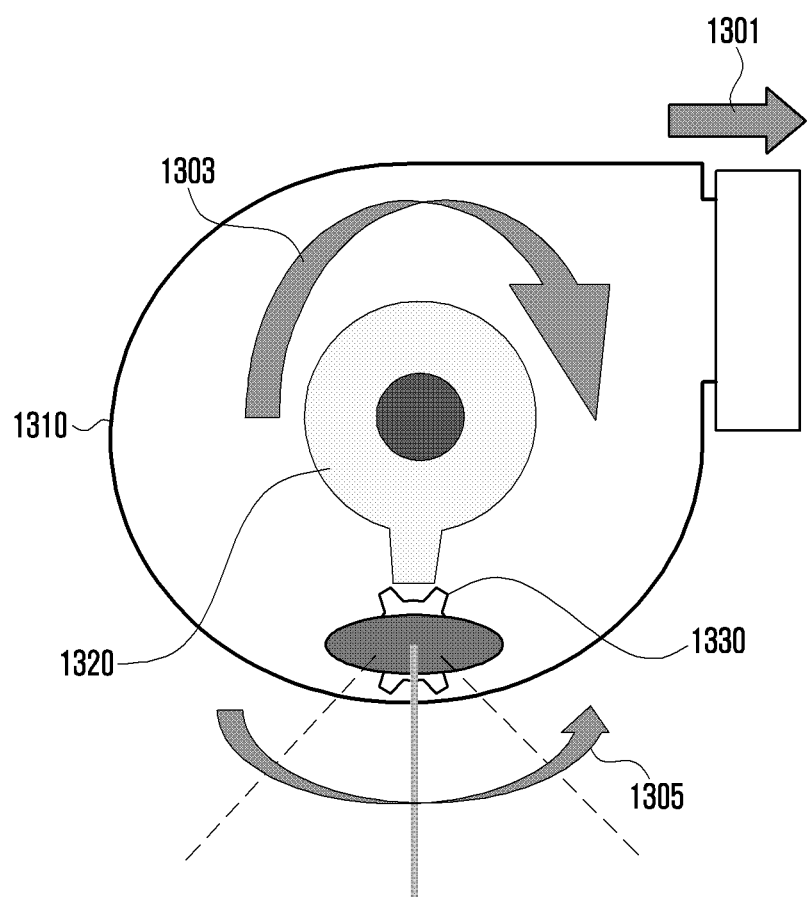
FIG. 13 and FIG. 14 are diagrams illustrating an example of a structure for controlling a camera module in an electronic device according to various embodiments.
Figure 14:
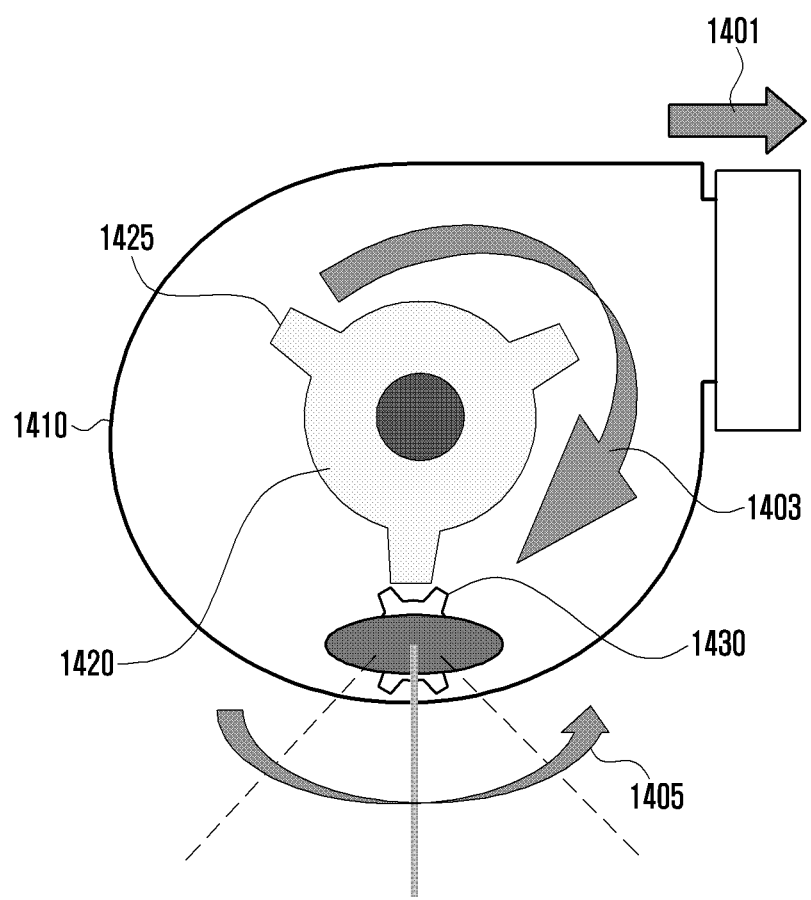

FIG. 13 and FIG. 14 are diagrams illustrating an example of a structure for controlling a camera module in an electronic device according to various embodiments.

In an embodiment, FIG. 13 and FIG. 14 may show various examples of moving (e.g., rotating) the angle of the camera module 180 according to external force making the display module 160 of the electronic device 101 be rolled (or slid out) in a designated discharge direction. For example, FIG. 13 and FIG. 14 may illustrate examples in which the camera module 180 (e.g., a front camera 1330 or 1430) is rotated according to rotation of an internal support member 1320 or 1420 (or a cylindrical part or a central axis) of the camera module 180 (e.g., the front camera 1330 or 1430).

According to an embodiment, FIG. 13 may show an example of controlling, by the processor 120, rotation of the camera module 180 in a case where the display module 160 is rolled (or slid out) from a housing 1310 in a designated discharge direction 1301. According to an embodiment, the processor 120 may determine a movement distance (or a movement amount) of the display module 160.

According to an embodiment, the processor 120 may drive a motor (or a drive unit) designed at the support member 1320 (or a cylindrical part) supporting (or fixing) the camera module 180, based on the determined movement distance, so as to rotate the support member 1320 of the camera module 180. For example, the support member 1320 may be rotated in a first direction 1303 with respect to an internal central shaft, and the front camera 1330 may be rotated in a second direction 1305 opposite to the first direction in response to (as a reaction to) the rotation of the support member 1320. For example, the camera module 180 may be controlled to be rotated by the processor 120 of the electronic device 101 in a software manner (e.g., generation of a motor driving signal).

According to an embodiment, FIG. 14 may show an example of, in a case where the display module 160 is rolled (or slid out) from a housing 1410 in a designated discharge direction 1401, mechanically (e.g., using a train gear structure) rotating the camera module 180 by using rotation (or rotational force) generated according to rolling of the display module 160.

According to an embodiment, the support member 1420 of the camera module 180 may be rotated (e.g., rotated in a first rotation direction 1403) in a process where the display module 160 is rolled. For example, the support member 1420 may be rotated (or moved) in the designated direction 1403 y times (e.g., y is 1 or greater) per x turns (e.g., x is 1 or greater) according to an amount (e.g., a movement amount) by which the display module 160 is unrolled (e.g., the rotation shaft of the display module 160 is defined to be rotated by an angle defined by the size of a gear (or a tooth) at the time of one movement). Therefore, an increase of a discharged amount caused by opening of the display module 160 may rotate the camera module 180 (e.g., the front camera 1430) in a designated direction 1405 by a particular angle (e.g., rotate in the second rotation direction 1405 opposite to the first rotation direction 1403).

According to an embodiment, the support member 1420 may have two or multiple guides 1425 (or rolling guides) designed on the support member 1420 according to a rotation amount of the central shaft thereof so as to enable more detailed adjustment of the angle of the front camera 1430. The example of FIG. 14 shows an example of a structure including three guides 1425. For example, the support member 1420 may be implemented to support the camera module 180, include one or more guides 1425, and include a gear structure interworking with rolling (or moving) of the display module 160. For example, rotation of the camera module 180 may be controlled as interaction caused by mechanical combination with the display module 160.

Figure 15:
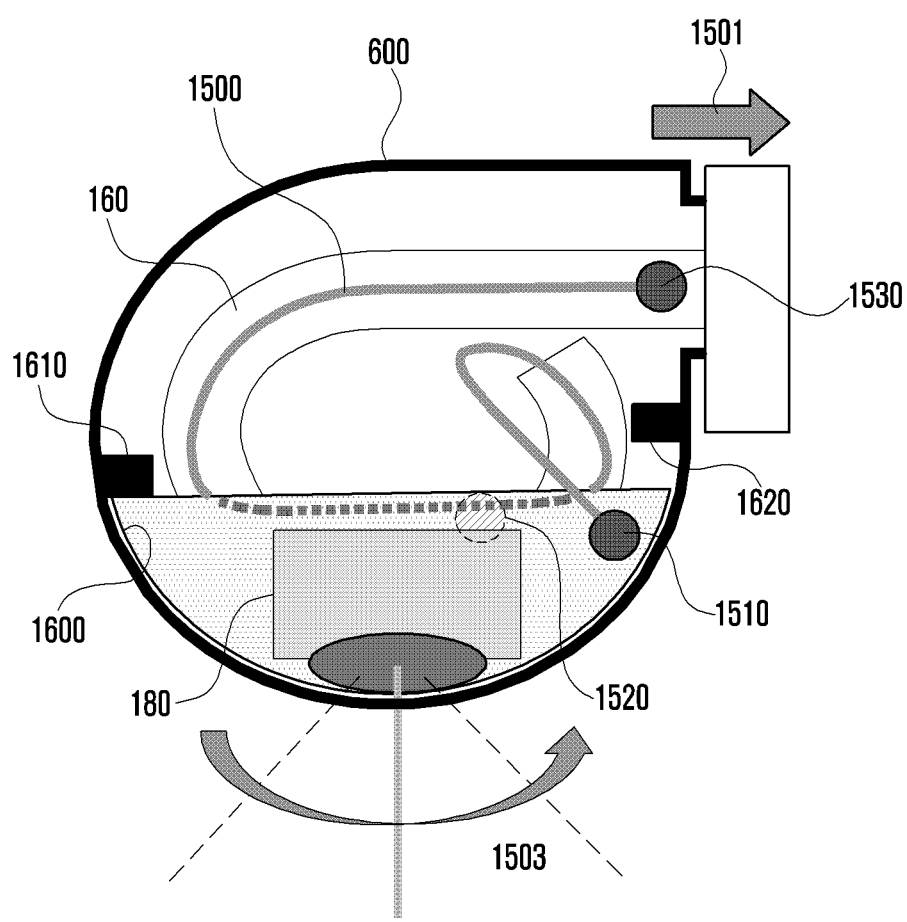
FIG. 15 and FIG. 16 are diagrams illustrating an example of a structure for controlling a camera module in an electronic device according to various embodiments.
Figure 16:
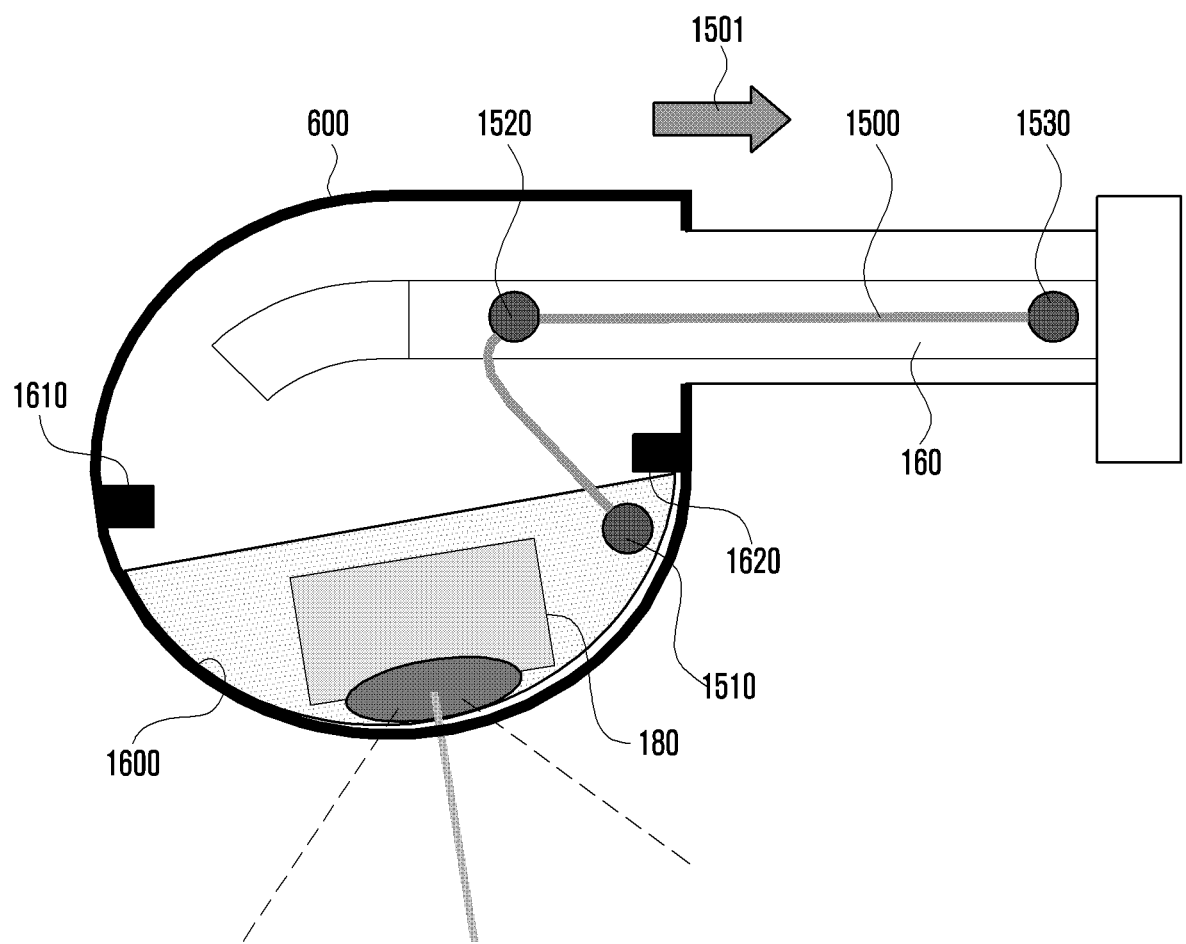

FIG. 15 and FIG. 16 are diagrams illustrating an example of a structure for controlling a camera module in an electronic device according to various embodiments.

In an embodiment, FIG. 15 and FIG. 16 may show other examples of moving (e.g., rotating) the angle of the camera module 180 according to external force making the display module 160 of the electronic device 101 be rolled (or slid out) in a designated discharge direction 1501. For example, FIG. 15 and FIG. 16 may show examples in which a rotation member 1600 including the camera module 180 disposed therein is rotated within a designated rotation range according to rolling (e.g., a discharged amount/an introduced amount) of the display module 160, and the camera module 180 is rotated based on the rotation of the rotation member 1600.

According to an embodiment, the electronic device 101 may include the display module 160 and the camera module 180 in the housing 600. According to an embodiment, the camera module 180 may be fixedly mounted to the rotation member 160 rotatably installed at one end (e.g., an upper end and/or a lower end) in the housing 600, and may be rotated (e.g., rotated in a rotation direction corresponding to a rotation direction 1503) according to rotation (e.g., rotation in the rotation direction 1503) of the rotation member 1600. According to an embodiment, the display module 160 may be supported by a slide plate slidably installed in the housing 600, and may be mechanically connected to an elastic member 1500 guiding movement (e.g., slide-in or slide-out) of the display module 160 (e.g., the slide plate) by using elastic force (or tension).

According to an embodiment, the elastic member 1500 may be transformed (e.g., expanded) by external force making the display module 160 be rolled (or slid out) in the designated discharge direction 1501, and may return to its original state due to external force removal causing the display module 160 be rolled (or slid in) in a direction opposite to the designated discharge direction 1501. For example, the elastic member 1500 may be implemented as an object (e.g., an elastic body) having elasticity, and for example, may include a rubber band or a spring. According to an embodiment, the elastic member 1500 may have one end fixedly connected to the rotation member 1600 of the camera module 180 by at least two fixing members (e.g., a first fixing member 1510, a second fixing member 1520, and a third fixing member 1530) and the other end fixedly connected to the display module 160 thereby. For example, the one end of the elastic member 1500 may be fixed to one part (e.g., a peripheral edge part) of the rotation member 1600 by the first fixing member 1510, and the other end thereof may be fixed to one part (e.g., a position adjacent to the outermost part exposed to the outside) of the display module 160 by the third fixing member 1530. According to an embodiment, the electronic device 101 may include at least one second fixing member 1520 for fixing the elastic member 1500 to at least a part of the display module 160 so as to cause the elastic member 1500 to be guided (e.g., rolled) in response to rolling of the display module 160.

According to an embodiment, the rotation member 1600 may be rotated in the designated direction 1503, based on elastic force of the elastic member 1500. For example, the rotation member 1600 may be rotated in the designated direction 1503 according to external force (e.g., pulling force) of the elastic member 1500 transformed according to rolling (or sliding out) of the display module 160 in the designated discharge direction 1501. As another example, the rotation member 1600 may return to its original state (e.g., return to its original position due to rotation opposite to rotation in the designated direction 1503) according to removal of the external force (e.g., removal of pulling force) from the elastic member 1500 transformed according to rolling (or sliding in) of the display module 160 in a direction opposite to the designated discharge direction.

According to an embodiment, the housing 600 may include, disposed therein, a guide (e.g., a first guide 1610 and a second guide 1620) for guiding the rotation member 1600 not to be rotated beyond a designated rotation range (or preventing same from being rotated beyond the designated rotation range). According to an embodiment, as illustrated in the example of FIG. 15, the first guide 1610 may be implemented to limit the rotation range of the rotation member 1600 when the rotation member 1600 is returned after being rotated in the designated direction 1503. According to an embodiment, as illustrated in the example of FIG. 16, the second guide 1620 may be implemented to limit the rotation range of the rotation member 1600 when the rotation member 1600 is rotated in the designated direction 1503. For example, as illustrated in FIG. 15 and FIG. 16, the first guide 1610 and the second guide 1620 may be designed to be misaligned while not facing each other in a horizontal line (or a straight line).

An operation method of the electronic device 101 according to an embodiment of the disclosure may include detecting operation initiation of a front camera of a camera module (e.g., the camera module 180 in FIG. 1 or FIG. 3), identifying a rolling state of a flexible display (e.g., the display module 160 in FIG. 1 or FIG. 2) of the electronic device 101, based on the operation initiation, rotating the camera module toward a designated direction, based on the rolling state of the flexible display, and based on the rolling state of the flexible display, displaying an image obtained from the designated direction via the camera module in a center of the flexible display.

According to an embodiment of the disclosure, the rotating may include identifying a rotation angle of the camera module, based on the rolling state of the flexible display, and rotating the camera module toward a designated direction, based on the rotation angle of the camera module.

According to an embodiment of the disclosure, the identifying may include determining whether the flexible display is in an open state or a closed state at a time of the operation initiation of the front camera, in case that the flexible display is in the closed state, controlling the front camera to operate in a first designated direction, and in case that the flexible display is in the open state, controlling the front camera to operate in a second designated direction.

According to an embodiment of the disclosure, the rotating may include determining a rotation angle corresponding to the rolling state of the flexible display, and rotating the front camera toward the second designated direction, based on the rotation angle, and the rotation angle may be determined at least based on a movement distance of the flexible display and a focal distance of the front camera.

According to an embodiment of the disclosure, the method may include, in case that the flexible display is in the open state, tracking a subject from an image obtained via the front camera, determine whether to rotate the front camera, based on a position of the subject obtained by the tracking of the subject, in case that it is determined that the position of the subject is in front of the front camera, determining not to rotate the front camera to cause the front camera to operate in the first designated direction, and in case that it is determined that the position of the subject is not in front of the front camera, determining to rotate the front camera to cause the front camera to operate in the second designated direction.

Various embodiments of the disclosure disclosed in the specification and drawings have presented specific examples to easily describe technical contents of the disclosure and help the understanding of the disclosure and are not intended to limit the scope of the disclosure. Therefore, the scope of the disclosure should be construed to include, in addition to the embodiments disclosed herein, all changes and modifications that are derived based on the technical idea of the disclosure.

What is claimed is:

1. An electronic device comprising:
a housing;
a flexible display is included as a roll-up type display within the housing and is configured to roll out in a designated direction from the housing, allowing a display area to partially expand;
a camera rotatably attached to an upper end of the housing;
at least one processor operatively connected to the flexible display and the camera; and
memory storing instructions that, when executed by the at least one processor, cause the electronic device to:
detect operation initiation of the camera;
identify a rolling state of the flexible display;
in a closed state of the flexible display, operate the camera to face a first designated direction;
in an open state of the flexible display, determine whether to rotate the camera from the first designated direction to face a second designated direction based on a position of a subject that is tracked; and
display an image obtained from the second designated direction via the camera on the flexible display.

2. The electronic device of claim 1, wherein the instructions, when executed the at least one processor, cause the electronic device to:
prior to identifying whether the flexible display is in the open state, identify a rotation angle of the camera, based on a rolling state of the flexible display; and
rotate the camera toward a designated direction, based on the rotation angle of the camera.

3. The electronic device of claim 1, wherein the instructions, when executed the at least one processor, cause the electronic device to:
determine whether the flexible display is in the open state or the closed state at a time of the operation initiation of the camera;
based on the flexible display being in the closed state, control the camera to operate in the first designated direction; and
based on the flexible display being in the open state, control the camera to operate in the second designated direction.

4. The electronic device of claim 3, wherein the instructions, when executed the at least one processor, cause the electronic device to:
monitor a rolling state of the flexible display, based on switching of the flexible display from the closed state to the open state; and
rotate the camera toward the second designated direction, based on the rolling state of the flexible display.

5. The electronic device of claim 4, wherein the instructions, when executed the at least one processor, cause the electronic device to:
determine a rotation angle corresponding to the rolling state of the flexible display; and
rotate the camera toward the second designated direction, based on the rotation angle,
wherein the rotation angle is based on a movement distance of the flexible display and a focal distance of the camera.

6. The electronic device of claim 4, wherein the instructions, when executed the at least one processor, cause the electronic device to, based on the flexible display being in the open state, rotate the camera toward a central axis direction of the flexible display to cause the subject to be positioned on a central axis of the camera.

7. The electronic device of claim 6, wherein the instructions, when executed the at least one processor, cause the electronic device to control the camera to be rotated by an angle corresponding to a movement distance of the flexible display to face the second designated direction.

8. The electronic device of claim 4, wherein the instructions, when executed the at least one processor, cause the electronic device to, based on the rotation of the camera, control the flexible display to display an image of the subject obtained via the camera in the center of the flexible display.

9. The electronic device of claim 1, wherein the instructions, when executed the at least one processor, cause the electronic device to:
based on determining that the position of the subject is in front of the camera, determine to not rotate the camera to cause the camera to operate in the first designated direction; and based on determining that the position of the subject is not in front of the camera, determine to rotate the camera to cause the camera to operate in the second designated direction.

10. The electronic device of claim 2, wherein the instructions, when executed the at least one processor, cause the electronic device to, at a time of using the camera, rotate an angle of the camera to correspond to the rolling state of the flexible display.

11. The electronic device of claim 2,
wherein the camera is disposed to be rotatable toward the designated direction at an end of the housing.

12. The electronic device of claim 2, wherein the camera is configured to be received in a housing, and be extended from the housing at a time of the operation initiation to be rotatable toward the designated direction at one end of the housing.

13. The electronic device of claim 2, wherein the camera is configured to be controlled to be rotated by the instructions or be controlled to be rotated based on an interaction caused by mechanical combination with the flexible display.

14. An operation method of an electronic device, the operation method comprising:
    detecting operation initiation of a camera of the electronic device;
    identifying a rolling state of a flexible display of the electronic device;
    in a closed state of the flexible display, operating the camera to face a first designated direction;
    determine whether to rotating the camera from the first designated direction to face a second designated direction based on a position of a subject that is tracked; and
    displaying an image obtained from the second designated direction via the camera on the flexible display.

15. The operating method of claim 14, wherein the operation method further comprises:
    prior to identifying whether the flexible display is in the open state, identifying a rotation angle of the camera, based on the rolling state of the flexible display; and
    rotating the camera toward a designated direction, based on the rotation angle of the camera.

16. The operating method of claim 15, the operation method further comprises:
    determining whether the flexible display is in the open state or the closed state at a time of the operation initiation of the camera;
    based on the flexible display being in the closed state, controlling the camera to operate in the first designated direction; and
    based on the flexible display being in the open state, controlling the camera to operate in the second designated direction.

17. The operating method of claim 16, the operating method further comprises:
    determining a rotation angle corresponding to the rolling state of the flexible display; and
    rotating the camera toward the second designated direction, based on the rotation angle, and
    the rotation angle is based on a movement distance of the flexible display and a focal distance of the camera.

18. The operating method of claim 16, the operation method further comprises:
    based on the flexible display being in the open state, tracking a subject from an image obtained via the camera, and
    determining whether to rotate the camera, based on a position of the subject obtained by the tracking of the subject.

19. The operating method of claim 18, further comprising:
    based on determining that the position of the subject is in front of the camera, determining to not rotate the camera to cause the camera to operate in the first designated direction; and
    based on determining that the position of the subject is not in front of the camera, determining to rotate the camera to cause the camera to operate in the second designated direction.

20. A non-transitory computer-readable medium storing a plurality of instructions, wherein execution of the plurality of instructions by at least one processor causes performance of a plurality of operations, the plurality of operations comprising:
    detecting operation initiation of a camera of the electronic device;
    identifying a rolling state of a flexible display of the electronic device;
    in a closed state of the flexible display, operating the camera to face a first designated direction;
    in an open state of the flexible display, determine whether to rotate the camera by an angle from the first designated direction to face a second designated direction based on a position of a subject that is tracked; and
    displaying an image obtained from the second designated direction via the camera on the flexible display.

* * * * *